United States Patent
Yamaura et al.

(10) Patent No.: US 12,476,667 B2
(45) Date of Patent: Nov. 18, 2025

(54) CANCELER DEVICE AND WIRELESS DEVICE

(71) Applicant: Mitsubishi Electric Corporation, Tokyo (JP)

(72) Inventors: Shingo Yamaura, Tokyo (JP); Kengo Nishimoto, Tokyo (JP); Yasuhiro Nishioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 314 days.

(21) Appl. No.: 18/229,346

(22) Filed: Aug. 2, 2023

(65) Prior Publication Data

US 2023/0378996 A1 Nov. 23, 2023

Related U.S. Application Data

(63) Continuation of application No. PCT/JP2021/010964, filed on Mar. 18, 2021.

(51) Int. Cl.
*H04B 7/00* (2006.01)
*H01Q 15/00* (2006.01)
(Continued)

(52) U.S. Cl.
CPC ......... *H04B 1/525* (2013.01); *H01Q 15/0053* (2013.01); *H04B 1/586* (2013.01)

(58) Field of Classification Search
CPC H04B 1/525; H04B 1/586; H04B 2001/7152; H04B 3/231
See application file for complete search history.

(56) References Cited

U.S. PATENT DOCUMENTS 6,236,285 B1 * 5/2001 Konishi .................. H01P 1/387
333/167
8,315,576 B2 * 11/2012 Jones ........................ H03F 3/68
455/325

(Continued)

FOREIGN PATENT DOCUMENTS

| JP | 4-278701 A | 10/1992 |
| JP | 2003-188604 A | 7/2003 |
| JP | 2003-273770 A | 9/2003 |

OTHER PUBLICATIONS

Huusari et al., "Wideband Self-Adaptive RF Cancellation Circuit for Full-Duplex Radio: Operating Principle and Measurements," 2015 IEEE 81st Vehicular Technology Conference (VTC Spring), Glasgow, 2015, total 7 pages.

(Continued)

*Primary Examiner* — Tuan Pham
(74) *Attorney, Agent, or Firm* — Birch, Stewart, Kolasch & Birch, LLP

(57) ABSTRACT

A canceler device includes: a line connector having a first terminal, a second terminal, and a third terminal, the line connector being configured to output a signal provided to the first terminal to the second terminal; and a reflection circuit to output a reflected wave of the signal output to the second terminal to the third terminal. The reflection circuit includes: a first variable resistor having a first end connected to the second terminal; a second variable resistor having a first end connected to the second terminal and a second end grounded; and a parallel resonance circuit having a first end connected to a second end of the first variable resistor and a second end grounded.

17 Claims, 20 Drawing Sheets

(51) Int. Cl.
    *H04B 1/525*    (2015.01)
    *H04B 1/58*     (2006.01)

(56) References Cited

U.S. PATENT DOCUMENTS 10,840,853 B2 * 11/2020 Nicholson ................. H03L 7/04
2004/0014449 A1   1/2004 Adachi et al.

OTHER PUBLICATIONS

International Search Report (PCT/ISA/210) issued in PCT/JP2021/010964, dated Jun. 22, 2021.

* cited by examiner

— 0Ω   ⋯⋯ 15Ω   ─ ─ ─ 33.3Ω
─ ─ 50Ω   —·—·— 70Ω

Impedance Characteristics

— 0Ω   ⋯⋯ 15Ω   ─ ─ ─ 33.3Ω   ─ ─ 50Ω   —·—·— 70Ω

Pass Characteristics

—— 0Ω   ········ 15Ω   — — — 33.3Ω
— —— 50Ω   —··—·· 65Ω

Impedance Characteristics

—— 0Ω   ········ 15Ω   — — — 33.3Ω   — — 50Ω   —··—·· 65Ω

Pass Characteristics

CANCELER DEVICE AND WIRELESS DEVICE

CROSS REFERENCE TO RELATED APPLICATIONS

This application is a Continuation of PCT International Application No. PCT/JP2021/010964, filed on Mar. 18, 2021, which is hereby expressly incorporated by reference into the present application.

TECHNICAL FIELD

The present disclosure relates to a canceler device and a wireless device.

BACKGROUND ART

In communication devices including a transmitter and a receiver, a part of a transmission signal output from the transmitter may leak into a reception path including the receiver as a leakage wave. In a case where the amplitude of the leakage wave is large, a phenomenon such as that the receiver cannot detect a reception signal may occur.

There are canceler devices (hereinafter, referred to as "canceler devices of the related art") that generate a cancellation signal for canceling the leakage wave and combine the cancellation signal with the leakage wave to suppress the leakage wave. The canceler devices of the related art include a vector adjuster, and the vector adjuster generates, from a transmission signal, a cancellation signal having the same amplitude as that of the leakage wave and having a phase opposite to that of the leakage wave. The vector adjuster includes a variable attenuator and a variable phase shifter.

Non-Patent Literature 1 discloses a canceler device capable of suppressing wideband leakage waves. The canceler device includes a branch circuit that makes a part of a transmission signal to branch into a plurality of branch lines, a plurality of vector adjusters provided to the respective branch lines, and a combining circuit that combines cancellation signals generated by the plurality of vector adjusters and a reception signal including a leakage wave. Since the canceler device includes the plurality of vector adjusters, it is possible to generate a cancellation signal depending on a frequency characteristic of the leakage wave.

CITATION LIST

Non-Patent Literature

Non-Patent Literature 1: T. Huusari, Y. Choi, P. Liikkanen, D. Korpi, S. Talwar and M. Valkama, "Wideband Self-Adaptive RF Cancellation Circuit for Full-Duplex Radio: Operating Principle and Measurements," 2015 IEEE 81st Vehicular Technology Conference (VTC Spring), Glasgow, 2015, pp. 1-7.

SUMMARY OF INVENTION

Technical Problem

The canceler device disclosed in Non Patent Literature 1 has a disadvantage that it is necessary to provide a vector adjuster to each of the plurality of branch lines.

The present disclosure has been made to solve the above disadvantage, and an object of the present disclosure is to obtain a canceler device capable of generating a cancellation signal depending on a frequency characteristic of a leakage wave without including a plurality of vector adjusters.

Solution to Problem

A canceler device according to the present disclosure includes a line connector having a first terminal, a second terminal, and a third terminal, the line connector being configured to output a signal provided to the first terminal to the second terminal; and a reflection circuit to output a reflected wave of the signal output to the second terminal to the third terminal. The reflection circuit includes: a first variable resistor having a first end connected to the second terminal; and a second variable resistor having a first end connected to the second terminal and a second end grounded; and a resonance circuit having a first end connected to a second end of the first variable resistor and a second end grounded.

Advantageous Effects of Invention

According to the present disclosure, it is possible to generate a cancellation signal depending on a frequency characteristic of a leakage wave without including a plurality of vector adjusters.

DESCRIPTION OF EMBODIMENTS

To describe the present disclosure further in detail, embodiments for carrying out the present disclosure will be described below with reference to the accompanying drawings.

First Embodiment

Figure 1:
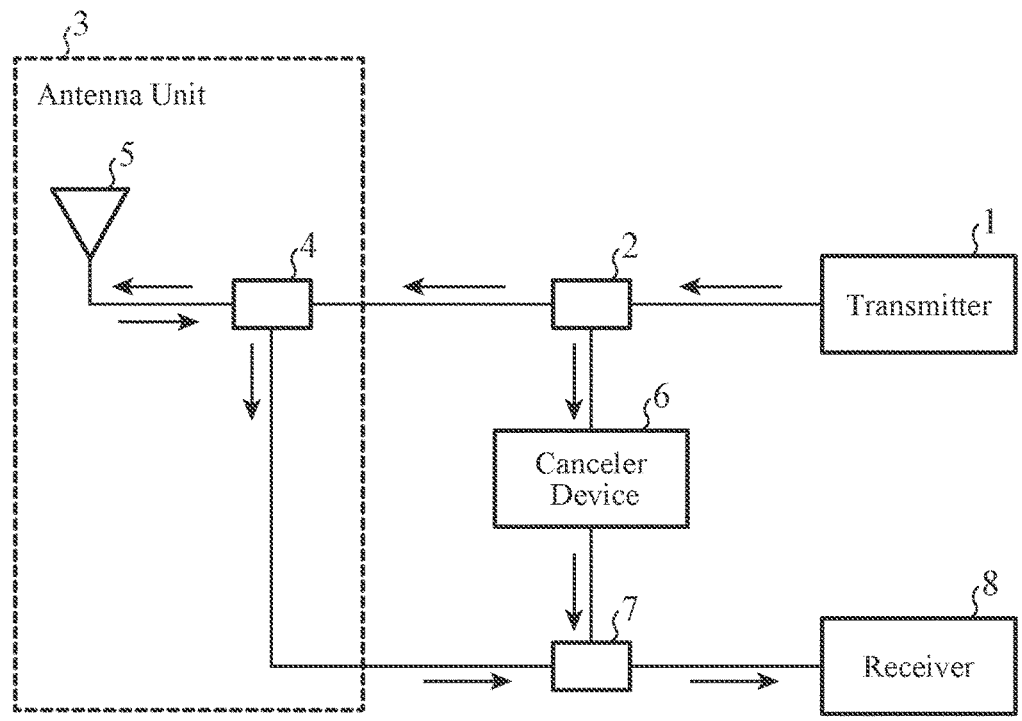
FIG. 1 is a configuration diagram illustrating a wireless device including a canceler device 6 according to a first embodiment.

FIG. 1 is a configuration diagram illustrating a wireless device including a canceler device 6 according to a first embodiment.

The wireless device illustrated in FIG. 1 includes a transmitter 1, a divider 2, an antenna unit 3, a canceler device 6, a combiner 7, and a receiver 8.

The transmitter 1 outputs a transmission signal to the divider 2.

The divider 2 divides the transmission signal output from the transmitter 1 into two.

The divider 2 outputs a first transmission signal of the two divided signals to the antenna unit 3 and outputs a second transmission signal of the two divided signals to the canceler device 6.

The antenna unit 3 includes a divider 4 and a transmission and reception shared antenna 5.

The antenna unit 3 radiates the first transmission signal output from the divider 2 into space as an electromagnetic wave.

The antenna unit 3 receives an incoming electromagnetic wave and outputs a reception signal of the received electromagnetic wave to the combiner 7.

The antenna unit 3 outputs a part of the first transmission signal output from the divider 2 to the combiner 7 as a leakage wave.

The divider 4 outputs the first transmission signal output from the divider 2 to the transmission and reception shared antenna 5.

The divider 4 outputs the reception signal output from the transmission and reception shared antenna 5 and a leakage wave output from the transmission and reception shared antenna 5 to the combiner 7.

The transmission and reception shared antenna 5 radiates the first transmission signal output from the divider 4 into space as an electromagnetic wave.

The transmission and reception shared antenna 5 receives an incoming electromagnetic wave and outputs a reception signal of the received electromagnetic wave to the divider 4.

The transmission and reception shared antenna 5 reflects a part of the first transmission signal output from the divider 4 and outputs the reflected transmission signal to the divider 4 as the leakage wave.

The canceler device 6 acquires the second transmission signal output from the divider 2.

The canceler device 6 generates a cancellation signal for canceling the leakage wave from the second transmission signal.

The canceler device 6 outputs the cancellation signal to the combiner 7.

The combiner 7 combines the leakage wave output from antenna unit 3 and the cancellation signal output from canceler device 6.

The combiner 7 outputs the combined signal of the leakage wave and the cancellation signal to the receiver 8 and outputs the reception signal output from the antenna unit 3 to the receiver 8. With the combiner 7 combining the leakage wave and the cancellation signal, the leakage wave is suppressed. For example, if the amplitude of the leakage wave is the same as the amplitude of the cancellation signal, and if the phase of the leakage wave is opposite to the phase of the cancellation signal, the signal output from the combiner 7 to the receiver 8 is only the reception signal.

The receiver 8 detects the reception signal output from the combiner 7.

Figure 2:
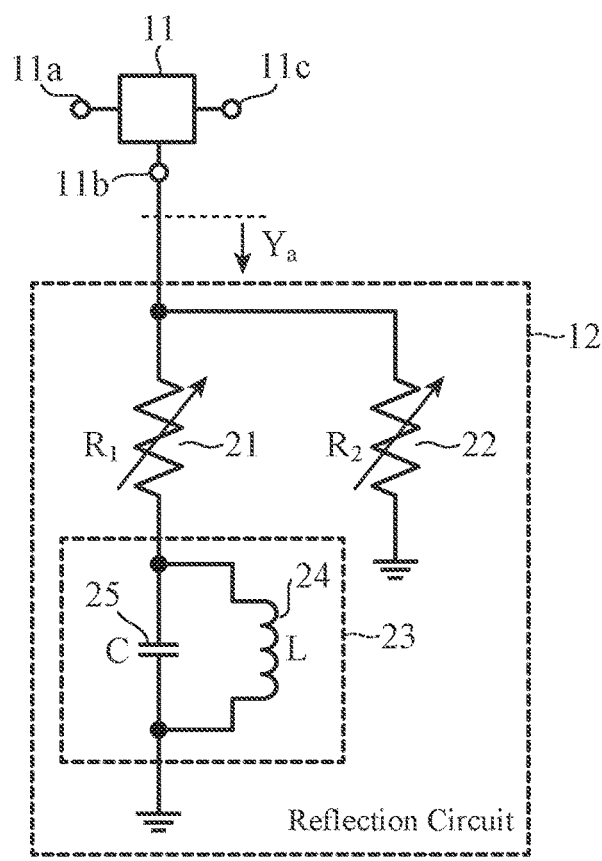
FIG. 2 is a configuration diagram illustrating the canceler device 6 according to the first embodiment.

FIG. 2 is a configuration diagram illustrating the canceler device 6 according to the first embodiment.

The canceler device 6 illustrated in FIG. 2 includes a line connector 11 and a reflection circuit 12.

The line connector 11 is implemented by, for example, a circulator or a directional coupler.

The line connector 11 includes a first terminal 11a, a second terminal 11b, and a third terminal 11c. In a case where the line connector 11 is implemented by, for example, a circulator, the forward direction of the line connector 11 includes a direction from the first terminal 11a to the second terminal 11b, a direction from the second terminal 11b to the third terminal 11c, and a direction from the third terminal 11c to the first terminal 11a.

The line connector 11 outputs the transmission signal provided to the first terminal 11a to the second terminal 11b.

The reflection circuit 12 includes a first variable resistor 21, a second variable resistor 22, and a resonance circuit.

In the canceler device 6 illustrated in FIG. 2, the resonance circuit included in the reflection circuit 12 is a parallel resonance circuit 23.

The reflection circuit 12 outputs a reflected wave of the transmission signal output to the second terminal 11b to the third terminal 11c. The reflected wave of the transmission signal is the cancellation signal for canceling the leakage wave.

The reflection circuit 12 has a combined admittance $Y_a$. Each of the amplitude and the phase of the reflected wave of the transmission signal is determined by the combined admittance $Y_a$.

A first end of the first variable resistor 21 is connected to the second terminal 11b, and a second end of the first variable resistor 21 is connected to a first end of the parallel resonance circuit 23. The resistance value of the first variable resistor 21 is $R_1$.

A first end of the second variable resistor 22 is connected to the second terminal 11b, and a second end of the second variable resistor 22 is grounded. The resistance value of the second variable resistor 22 is $R_2$.

The parallel resonance circuit 23 includes an inductor 24 and a capacitor 25.

The first end of the parallel resonance circuit 23 is connected to the second end of the first variable resistor 21, and a second end of the parallel resonance circuit 23 is grounded. The resonance frequency of the parallel resonance circuit 23 is denoted by fr.

A first end of the inductor 24 is connected to the second end of the first variable resistor 21, and a second end of the inductor 24 is grounded. The inductance of the inductor 24 is denoted by L.

The capacitor 25 is connected in parallel with the inductor 24. The capacitance of the capacitor 25 is denoted by C.

Next, the operation of the wireless device illustrated in FIG. 1 will be described.

The transmitter 1 generates a transmission signal and outputs the transmission signal to the divider 2. A part of the transmission signal output from the transmitter 1 may leak into the receiver 8 as a leakage wave.

In the wireless device illustrated in FIG. 1, the canceler device 6 generates a cancellation signal for suppressing the leakage wave, and the leakage wave is suppressed by the cancellation signal.

The divider 2 divides the transmission signal output from the transmitter 1 into two.

The divider 2 outputs the first transmission signal of the two divided signals to the divider 4 of the antenna unit 3 and outputs the second transmission signal of the two divided signals to the canceler device 6.

Upon receiving the transmission signal from the divider 2, the divider 4 of the antenna unit 3 outputs the transmission signal to the transmission and reception shared antenna 5.

Upon receiving the transmission signal from the divider 4, the transmission and reception shared antenna 5 radiates the transmission signal into space as the electromagnetic wave.

When an electromagnetic wave arrives, the transmission and reception shared antenna 5 receives the electromagnetic wave and outputs a reception signal of the received electromagnetic wave to the divider 4.

When receiving the transmission signal from the divider 4, the transmission and reception shared antenna 5 reflects a part of the transmission signal and outputs the reflected transmission signal to the divider 4 as a leakage wave.

The divider 4 outputs each of the reception signal and the leakage wave output from the transmission and reception shared antenna 5 to the combiner 7.

The canceler device 6 acquires the second transmission signal of the two divided signals from the divider 2.

The canceler device 6 generates a cancellation signal for canceling the leakage wave from the second transmission signal.

The canceler device 6 outputs the cancellation signal to the combiner 7.

The combiner 7 combines the leakage wave output from antenna unit 3 and the cancellation signal output from canceler device 6.

The combiner 7 outputs the combined signal of the leakage wave and the cancellation signal to the receiver 8 and outputs the reception signal output from the antenna unit 3 to the receiver 8. For example, if the amplitude of the leakage wave is the same as the amplitude of the cancellation signal, and if the phase of the leakage wave is opposite to the phase of the cancellation signal, the signal output from the combiner 7 to the receiver 8 is only the reception signal.

The receiver 8 detects the reception signal output from the combiner 7.

Hereinafter, the operation of the canceler device 6 will be specifically described.

The line connector 11 outputs the transmission signal provided to the first terminal 11a to the second terminal 11b.

When the transmission signal provided to the first terminal 11a is output to the second terminal 11b, the reflection circuit 12 outputs a reflected wave of the transmission signal to the third terminal 11c.

Each of the amplitude and the phase of the reflected wave of the transmission signal is determined by the combined admittance $Y_a$ of the reflection circuit 12.

The combined admittance $Y_a$ is represented by the following Equation (1).

$$Y_a = \frac{1}{R_1 + \dfrac{1}{j\left(\omega C - \dfrac{1}{\omega L}\right)}} \; \frac{1}{R_2} \tag{1}$$

In Equation (1), $\omega$ denotes an angular frequency. Where the frequency of the transmission signal is f, the angular frequency $\omega$ is given by $\omega = 2\pi f$.

In the canceler device 6 illustrated in FIG. 2, the line connector 11 is implemented by a circulator, and it is based on the premise that the circulator has an ideal characteristic. The ideal characteristic include an insertion loss of 0 [dB], infinite isolation, and a reflection loss of 0 [dB].

With a combined impedance $Z_a$ ($1/Y_a$) expressed by the combined admittance $Y_a$, a reflection coefficient $\Gamma_a$ of the reflection circuit 12 is expressed by following Equation (2).

$$\Gamma_a = \frac{Z_a - Z_0}{Z_a + Z_0} \tag{2}$$

In Equation (2), $Z_0$ represents an impedance of each of feed lines and ports of the canceler device 6.

Therefore, an S parameter $S_{21}$ indicating the pass characteristic from the first terminal 11a to the third terminal 11c is expressed by the following Equation (3). The first terminal 11a corresponds to a port 1, and the third terminal 11c corresponds to a port 2.

$$S_{21}\,[\text{dB}] = 20 * \log_{10}(|\Gamma_a|) \tag{3}$$

The amplitude frequency characteristic of the pass characteristic is determined by the resistance value $R_1$ of the first variable resistor 21, the resistance value $R_2$ of the second variable resistor 22, and the inductance L and the capacitance C which are circuit specifications of the parallel resonance circuit 23.

Hereinafter, a method of controlling the amplitude frequency characteristic will be described.

Figure 3A:
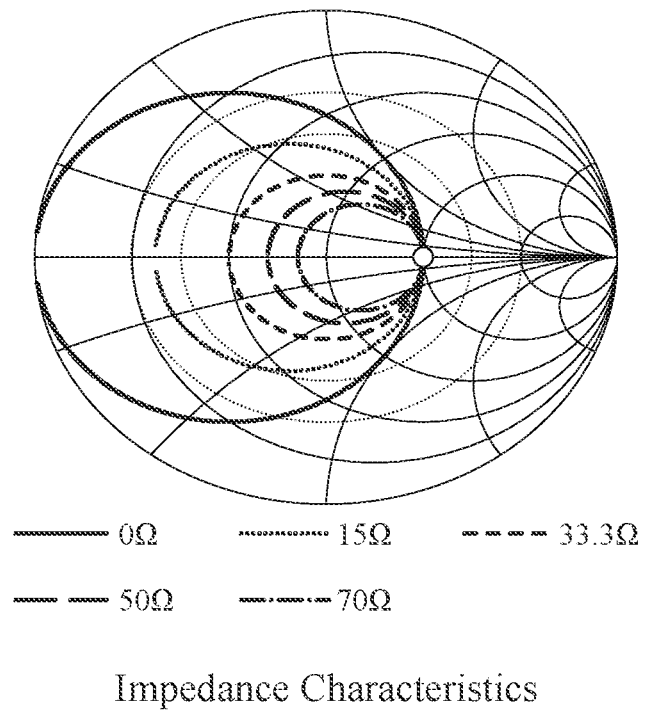
FIG. 3A is an explanatory diagram illustrating an impedance characteristic of the canceler device 6.
Figure 3B:
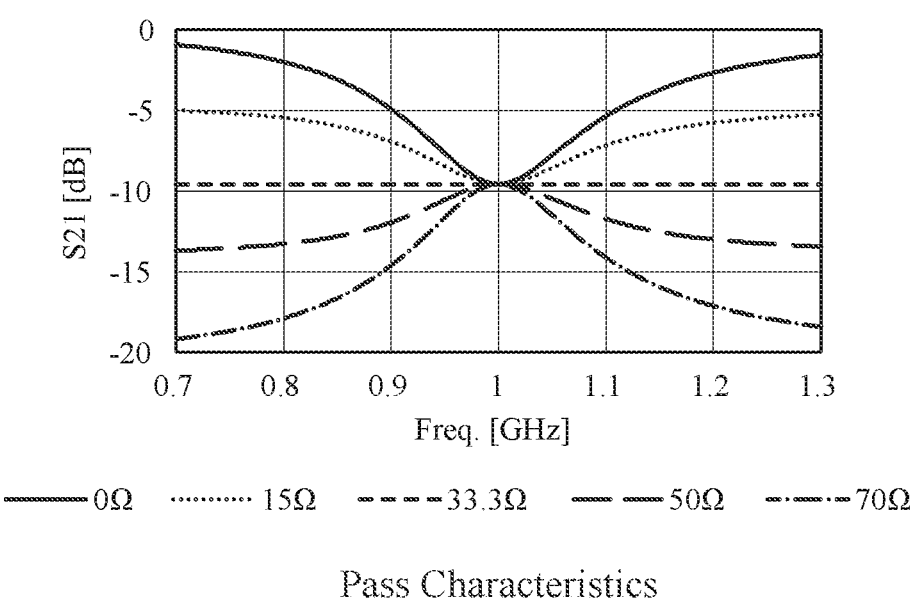
FIG. 3B is an explanatory diagram illustrating a $S_{21}$ characteristic which is a pass characteristic of the canceler device 6.

FIG. 3A is an explanatory diagram illustrating an impedance characteristic of the canceler device 6, and FIG. 3B is an explanatory diagram illustrating a $S_{21}$ characteristic which is a pass characteristic of the canceler device 6.

FIG. 3B illustrates the $S_{21}$ characteristic based on changes in the resistance value $R_1$ of the first variable resistor 21, wherein the resistance value $R_2$ of the second variable resistor 22 is 100 [Ω], the inductance L of the inductor 24 is 2 [nH], and the resonance frequency fr of the parallel resonance circuit 23 is 1 [GHz].

In FIGS. 3A and 3B, a solid line indicates a resistance value $R_1$ of 0 [Ω], a dotted line indicates a resistance value $R_1$ of 15 [Ω], a short-interval broken line indicates a resistance value $R_1$ of 33.3 [Ω], a long-interval broken line indicates a resistance value $R_1$ of 50 [Ω], and a one-dot chain line indicates a resistance value $R_1$ of 70 [Ω]. An open circle "○" denotes the resonance frequency fr.

The capacitance C at the resonance frequency fr is expressed by the following Equation (4).

$$C = \frac{1}{(2\pi fr)^2 L} \qquad (4)$$

As illustrated in FIG. 3B, the frequency characteristic of a pass amplitude changes as the resistance value $R_1$ of the first variable resistor 21 changes.

That is, in a case where the resistance value $R_1$ of the first variable resistor 21 is 0 [Ω] or the resistance value $R_1$ is 15 [Ω], the frequency characteristic of a pass amplitude has a concave shape, and in a case where the resistance value $R_1$ of the first variable resistor 21 is 33.3 [Ω], the frequency characteristic of a pass amplitude has a flat shape.

Moreover, in a case where the resistance value $R_1$ of the first variable resistor 21 is 50 [Ω] or the resistance value $R_1$ is 70 [Ω], the frequency characteristic of a pass amplitude has a convex shape.

Therefore, for example, with a control device (not illustrated) changing only the resistance value $R_1$ of the first variable resistor 21, it is possible to form a concave frequency characteristic of a pass amplitude, a convex frequency characteristic of a pass amplitude, or a flat frequency characteristic of a pass amplitude.

As the resistance value $R_1$ of the first variable resistor 21 and the resistance value $R_2$ of the second variable resistor 22 change, the inclination of the concave shape of the concave frequency characteristic of the pass amplitude or the inclination of the convex shape in the convex frequency characteristic of the pass amplitude changes.

In a case where the pass characteristic of the canceler device 6 has a concave frequency characteristic of the pass amplitude, for example, with a control device (not illustrated) causing the resistance value $R_2$ of the second variable resistor 22 to change, the minimum value of the pass amplitude changes. In a case where the pass characteristic of the canceler device 6 has a convex frequency characteristic of the pass amplitude, for example, with a control device (not illustrated) causing the resistance value $R_2$ of the second variable resistor 22 to change, the maximum value of the pass amplitude changes.

When one or more of the inductance L of the inductor 24 and the capacitance C of the capacitor 25 change in a state where the resonance frequency fr of the parallel resonance circuit 23 is maintained, and a Q value of the parallel resonance circuit 23 changes, the inclination of the concave shape or the inclination of the convex shape changes. The Q value of the parallel resonance circuit 23 is expressed by the following Equation (5).

$$Q = R\sqrt{\frac{C}{L}} \qquad (5)$$

In Equation (5), R denotes a resistance component included in the parallel resonance circuit 23. That is, it is a resistance component (not illustrated) connected in parallel with each of the inductance L and the capacitance C.

When one or more of the inductance L and the capacitance C change, the frequency of the minimum value and the frequency of the maximum value of each of the pass amplitude of the concave shape and the pass amplitude of the convex shape change. Therefore, the canceler device 6 can generate a cancellation signal having a rising frequency characteristic or a decreasing frequency characteristic in a desired band.

The condition for the frequency characteristic of a pass amplitude to be flat, namely, the condition for the frequency characteristic of a pass amplitude to be a boundary between a concave frequency characteristic of a pass amplitude and a convex frequency characteristic of a pass amplitude is as follows.

The condition for a frequency characteristic of a pass amplitude to be flat is that a reflection coefficient $\Gamma_a$ (f=fr), at the resonance frequency fr of the parallel resonance circuit 23, and the reflection coefficient $\Gamma_a$ (f=0), when the frequency f of the transmission signal is 0 in the limit, have the same value but opposite signs.

The combined admittance $Y_a$ (f=fr) at the resonance frequency fr of the reflection circuit 12 is determined by the resistance value $R_2$ of the second variable resistor 22 regardless of the resistance value $R_1$ of the first variable resistor 21. The combined admittance $Y_a$ (f=fr) at this point is $1/R_2$. The combined admittance $Y_a$ (f=0) with a reflection coefficient of $\Gamma_a$ (f=0) having the same value as that of the reflection coefficient $\Gamma_a$ (f=fr) but an opposite sign to that of the reflection coefficient $\Gamma_a$ (f=fr) is $R_2/Z_0^2$. Therefore, in Equation (1), the condition for the frequency characteristic of a pass amplitude to be flat is obtained from the conditional expression where the combined admittance $Y_a$ equals $R_2/Z_0^2$. An imaginary part of a first term on the right side of Equation (1) where each of the frequency f and the angular frequency ω is zero in the limit equals zero as shown in the following Equation (6).

$$\lim_{\omega \to 0}\left(\frac{1}{\omega C - \frac{1}{\omega L}}\right) = 0 \qquad (6)$$

Therefore, Equation (1) when each of the frequency f and the angular frequency co equals zero in the limit is expressed as the following Equation (7).

$$\frac{R_2}{Z_0^2} = \frac{1}{R_1} + \frac{1}{R_2} \qquad (7)$$

Solving Equation (7) for the resistance value $R_1$ of the first variable resistor 21, the resistance value $R_1$ is expressed as the following Equation (8).

$$R_1 = \frac{R_2 Z_0^2}{R_2^2 - Z_0^2} \qquad (8)$$

The frequency characteristic of a pass amplitude is flat where Equation (8) holds.

Figure 4:
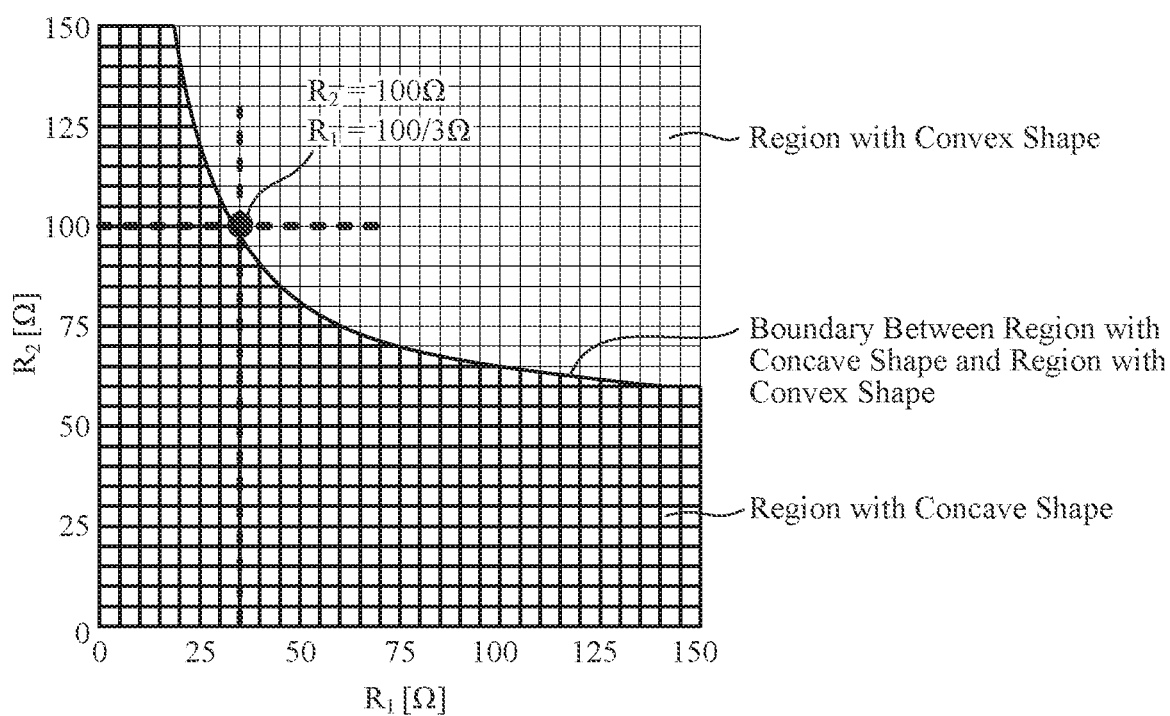
FIG. 4 is an explanatory diagram illustrating a region in which the frequency characteristic of a pass amplitude has a concave shape and a region in which the frequency characteristic has a convex shape due to a change in each of a resistance value $R_1$ of a first variable resistor 21 and a resistance value $R_2$ of a second variable resistor 22 where $Z_0$=50 [Ω].

FIG. 4 is an explanatory diagram illustrating a region in which the frequency characteristic of a pass amplitude has a concave shape and a region in which the frequency characteristic has a convex shape due to a change in each of the resistance value $R_1$ of the first variable resistor 21 and the resistance value $R_2$ of the second variable resistor 22 where $Z_0=50$ [Ω]. In FIG. 4, the horizontal axis represents the resistance value $R_1$[Ω], and the vertical axis represents the resistance value $R_2$[Ω].

The boundary between the region with a concave shape and the region with a convex shape can be drawn by Equation (8). For example, where $R_2=100$ [Ω], the frequency characteristic of a pass amplitude is flat where $R_1=100/3$ [Ω].

As illustrated in FIG. 4, the condition for the frequency characteristic of a pass amplitude to have a convex shape is that the resistance value $R_2$ of the second variable resistor 22 is equal to or larger than the impedance $Z_0$. In a case where the frequency characteristic of a pass amplitude is close to the boundary between the region with a concave shape and the region with a convex shape, each inclination of a concave frequency characteristic of a pass amplitude and a convex frequency characteristic of a pass amplitude is gentle.

In the first embodiment described above, the canceler device 6 is configured to include: the line connector 11 including the first terminal 11a, the second terminal 11b, and the third terminal 11c, the line connector 11 to output a signal provided to the first terminal 11a to the second terminal 11b; and the reflection circuit 12 to output a reflected wave of the signal output to the second terminal 11b to the third terminal 11c. The reflection circuit 12 includes: the first variable resistor 21 having the first end connected to the second terminal 11b; the second variable resistor 22 having the first end connected to the second terminal 11b and the second end grounded; and the parallel resonance circuit 23 having the first end connected to the second end of the first variable resistor 21 and the second end grounded. Therefore, the canceler device 6 can generate the cancellation signal depending on the frequency characteristic of the leakage wave without including a plurality of vector adjusters.

Second Embodiment

In a second embodiment, a canceler device 6 which includes a plurality of series circuits in which a first variable resistor 21 and a parallel resonance circuit 23 are connected in series, and in which the plurality of series circuits is connected in parallel with a reflection circuit 12, will be described.

Figure 5:
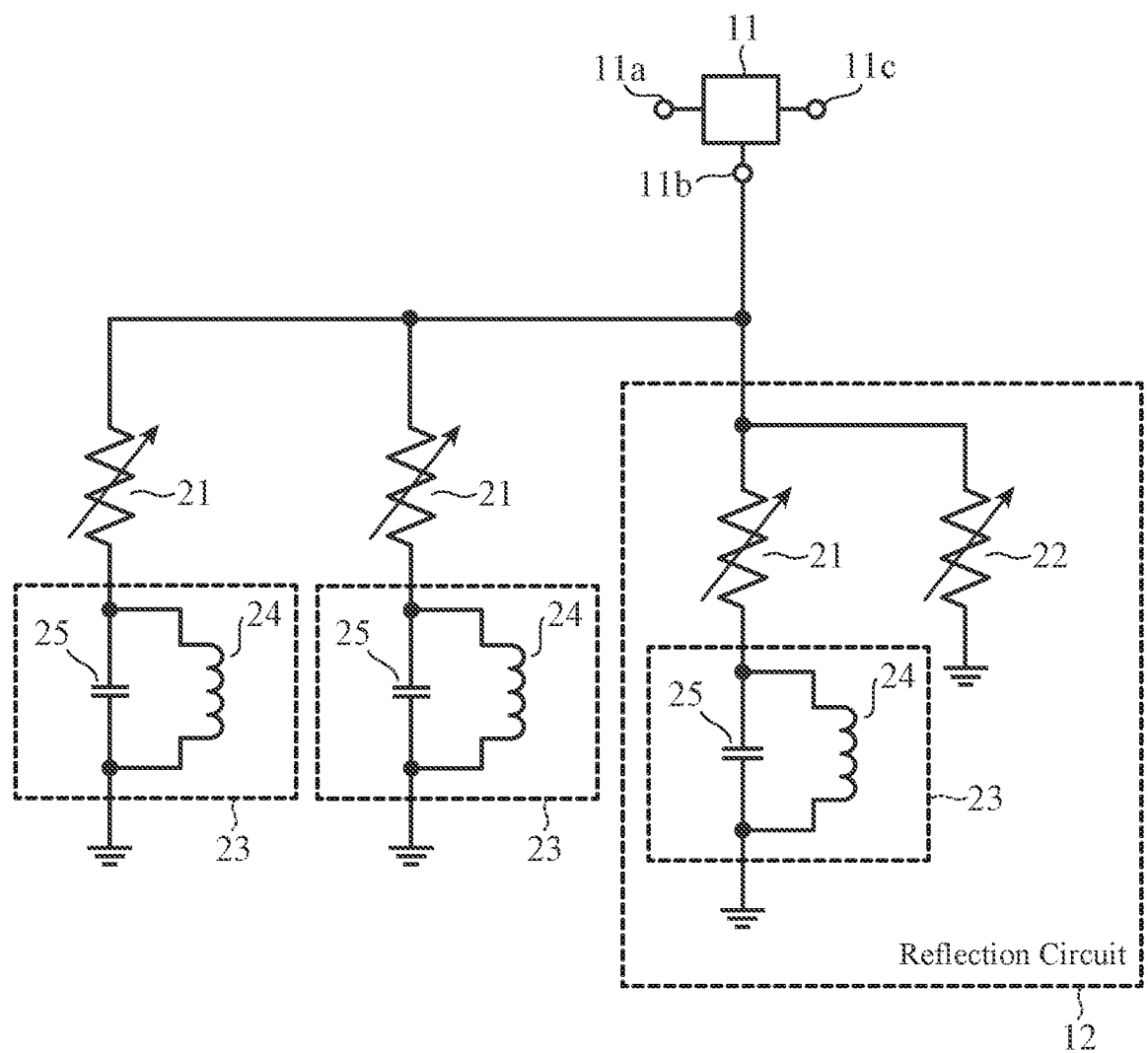
FIG. 5 is a configuration diagram illustrating a canceler device 6 according to a second embodiment.

FIG. 5 is a configuration diagram illustrating the canceler device 6 according to the second embodiment. In FIG. 5, the same symbol as that in FIG. 2 represents the same or a corresponding part, and thus description thereof is omitted.

In the canceler device 6 illustrated in FIG. 5, two series circuits, each in which a first variable resistor 21 and a parallel resonance circuit 23 are connected in series, are connected in parallel with the reflection circuit 12.

In the canceler device 6 illustrated in FIG. 5, the two series circuits are connected in parallel to the reflection circuit 12. However, this is merely an example, and one series circuit may be connected in parallel with the reflection circuit 12, or three or more series circuits may be connected in parallel with the reflection circuit 12.

In the canceler device 6 illustrated in FIG. 2, a frequency characteristic of one pass amplitude is formed. The frequency characteristic of a pass amplitude include a concave frequency characteristic of a pass amplitude, a convex frequency characteristic of a pass amplitude, and a flat frequency characteristic of a pass amplitude.

In the canceler device 6 illustrated in FIG. 5, since the two series circuits, each in which a first variable resistor 21 and a parallel resonance circuit 23 are connected in series, are connected in parallel with the reflection circuit 12, a frequency characteristic of three pass amplitudes are formed. Since the frequency characteristic of three pass amplitudes are formed, the canceler device 6 illustrated in FIG. 5 can suppress a leakage wave included in each of the three bands (multi-bands).

Note that in a case where three or more series circuits are connected in parallel to the reflection circuit 12, a frequency characteristic of four or more pass amplitudes are formed, and thus a canceler device 6 including three or more series circuits can suppress a leakage wave included in each of four or more bands.

Third Embodiment

In a third embodiment, a canceler device 6 in which a plurality of reflection circuits 12 is connected in parallel will be described.

Figure 6:
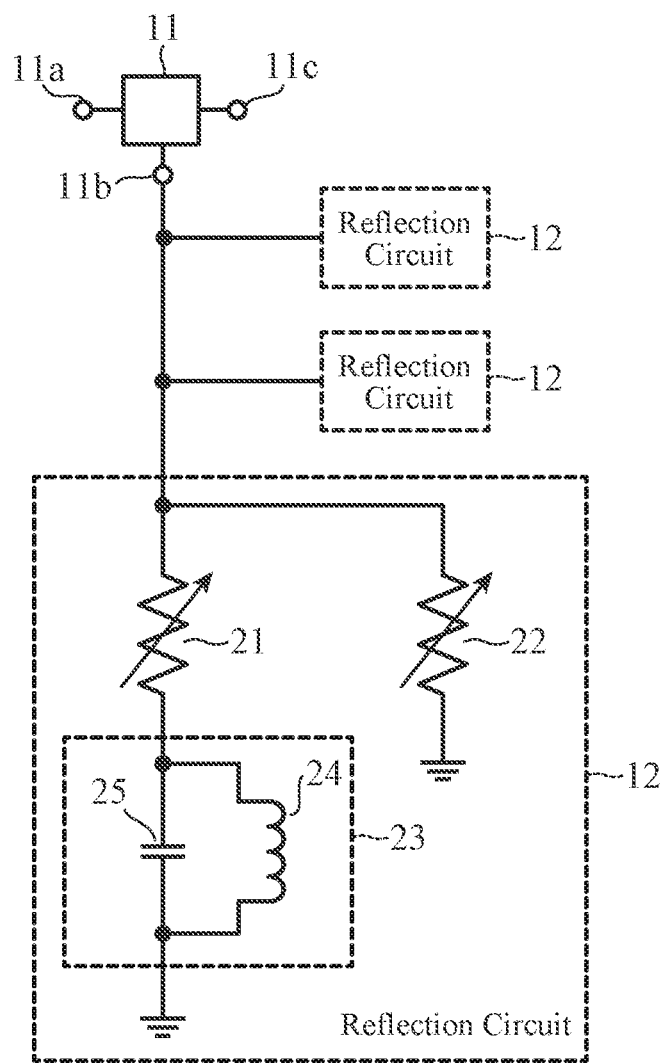
FIG. 6 is a configuration diagram illustrating a canceler device 6 according to a third embodiment.

FIG. 6 is a configuration diagram illustrating the canceler device 6 according to the third embodiment. In FIG. 6, the same symbol as that in FIG. 2 represents the same or a corresponding part, and thus description thereof is omitted.

In the canceler device 6 illustrated in FIG. 6, three reflection circuits 12 are connected in parallel. However, this is merely an example, and two reflection circuits 12 may be connected in parallel, or four or more reflection circuits 12 may be connected in parallel.

In the canceler device 6 illustrated in FIG. 2, a frequency characteristic of one pass amplitude is formed.

In the canceler device 6 illustrated in FIG. 6, since the three reflection circuits 12 are connected in parallel, frequency characteristics of three pass amplitudes are formed. Since the frequency characteristics of the three pass amplitudes are formed, the canceler device 6 illustrated in FIG. 6 can suppress a leakage wave included in each of three bands.

Note that in a case where four or more reflection circuits 12 are connected in parallel, frequency characteristics of four or more pass amplitudes are formed, and thus a canceler device 6 including four or more reflection circuits 12 can suppress a leakage wave included in each of four or more bands.

Fourth Embodiment

In a fourth embodiment, a canceler device 6 in which a plurality of line connectors 11 is connected in series and a reflection circuit 12 is connected to each of the line connectors 11 will be described.

Figure 7:
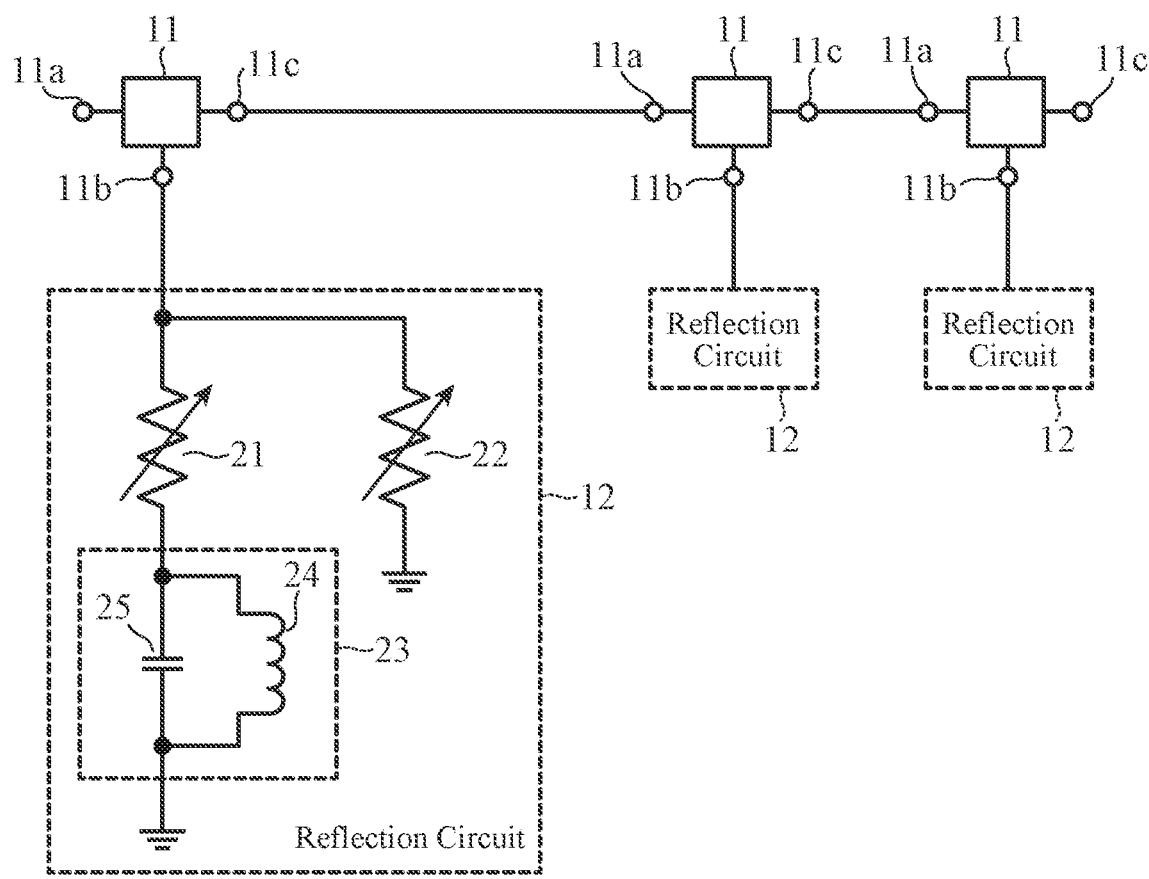
FIG. 7 is a configuration diagram illustrating a canceler device 6 according to a fourth embodiment.

FIG. 7 is a configuration diagram illustrating the canceler device 6 according to the fourth embodiment. In FIG. 7, the same symbol as that in FIG. 2 represents the same or a corresponding part, and thus description thereof is omitted.

In the canceler device 6 illustrated in FIG. 7, three line connectors 11 are connected in series, and a reflection circuit 12 is connected to each of the line connectors 11. However, this is merely an example, and two line connectors 11 may be connected in series, and a reflection circuit 12 may be connected to each of the line connectors 11, or four or more line connectors 11 may be connected in series, and a reflection circuit 12 may be connected to each of the line connectors 11.

In the canceler device 6 illustrated in FIG. 2, a frequency characteristic of one pass amplitude is formed.

In the canceler device 6 illustrated in FIG. 7, since a reflection circuit 12 is connected to each of the three line connectors 11, frequency characteristics of three pass amplitudes are formed. Since the frequency characteristics of the three pass amplitudes are formed, the canceler device 6 illustrated in FIG. 7 can suppress a leakage wave included in each of three bands.

Note that in a case where a reflection circuit 12 is connected to each of four or more line connectors 11, frequency characteristics of four or more pass amplitudes are formed, and thus a canceler device 6, in which a reflection circuit 12 is connected to each of the four or more line connectors 11, can suppress a leakage wave included in each of four or more bands.

Fifth Embodiment

In a fifth embodiment, a canceler device 6 in which a resonance circuit of a reflection circuit 12 includes a tip short-circuited stub 26 instead of a parallel resonance circuit 23 will be described.

Figure 8:
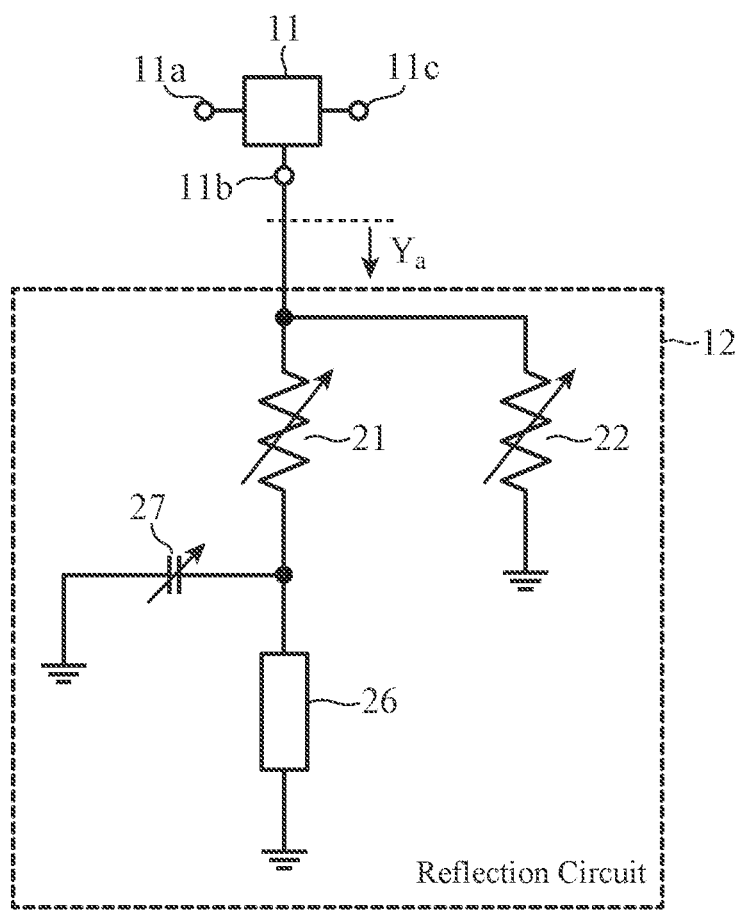
FIG. 8 is a configuration diagram illustrating a canceler device 6 according to a fifth embodiment.

FIG. 8 is a configuration diagram illustrating the canceler device 6 according to the fifth embodiment. In FIG. 8, the same symbol as that in FIG. 2 represents the same or a corresponding part, and thus description thereof is omitted.

The tip short-circuited stub 26 is implemented by, for example, a microstrip line on a dielectric substrate.

A first end of the tip short-circuited stub 26 is connected to a second end of the first variable resistor 21, and a second end of the tip short-circuited stub 26 is grounded.

In a case where the electrical length of the tip short-circuited stub 26 is 0.25 wavelengths×(2N+1), the resonance frequency is given by a frequency corresponding to 0.25 wavelengths×(2N+1). Symbol N is an integer greater than or equal to 0. Near the resonance frequency, the tip short-circuited stub 26 operates as a parallel resonance circuit.

In a case where a tip open stub having an electrical length of 0.5 wavelengths×(2N+1) is used instead of a parallel resonance circuit 23, the resonance frequency is given by a frequency corresponding to 0.5 wavelengths×(2N+1). Near the resonance frequency, the tip open stub operates as a parallel resonance circuit.

A variable capacitor 27 is implemented by, for example, an electrically controlled element or a mechanically controlled element. A variable capacitance diode or the like corresponds to the electrically controlled element.

A first end of the variable capacitor 27 is connected to the second end of the first variable resistor 21, and a second end of the variable capacitor 27 is grounded.

Next, the operation of the canceler device 6 illustrated in FIG. 8 will be described.

A Q value of the tip short-circuited stub 26 changes, for example, when the characteristic impedance of a microstrip line included in the tip short-circuited stub 26 changes. The characteristic impedance of the microstrip line changes as the thickness of a dielectric substrate or the line width changes.

In the canceler device 6 illustrated in FIG. 2, since the reflection circuit 12 includes the parallel resonance circuit 23, and the parallel resonance circuit 23 includes the inductor 24 which is a lumped-parameter element and the capacitor 25 which is a lumped-parameter element, the parallel resonance circuit 23 has a resistance component. Therefore, there are cases where it is difficult to increase the Q value of the parallel resonance circuit 23.

In the canceler device 6 illustrated in FIG. 8, for example, in a case where the tip short-circuited stub 26 having a distributed constant is implemented by a microstrip line on a low-loss dielectric substrate, the Q value of the tip short-circuited stub 26 can be made higher than the Q value of the parallel resonance circuit 23.

In addition, in the parallel resonance circuit 23 having a lumped-parameter element, contribution of a parasitic component increases at a high frequency equal to or greater than several GHz, and unnecessary resonance or the like may occur. For this reason, at a high frequency equal to or greater than several GHz, there are cases where it is difficult to simply design a parallel resonance circuit 23 having a lumped-parameter element.

On the other hand, the tip short-circuited stub 26 having a distributed constant is less affected by a parasitic component or the like even at a high frequency equal to or greater than several GHz, and thus it is possible to design the tip short-circuited stub 26 more simply than the parallel resonance circuit 23 having a lumped-parameter element.

An equivalent circuit of the tip short-circuited stub 26 is a parallel resonance circuit in which an inductor and a capacitor are connected in parallel. Therefore, in the tip short-circuited stub 26, the resonance frequency fr changes with the capacitance of the variable capacitor 27 adjusted.

In the above-described fifth embodiment, the canceler device 6 illustrated in FIG. 8 is configured such that the resonance circuit includes the tip short-circuited stub 26 having the first end connected to the second end of the first variable resistor 21 and the second end grounded. Therefore, similarly to the canceler device 6 illustrated in FIG. 2, the canceler device 6 illustrated in FIG. 8 can generate a cancellation signal depending on the frequency characteristic of a leakage wave without including a plurality of vector adjusters. In addition, the canceler device 6 illustrated in FIG. 8 can increase the Q value of the resonance circuit and can also suppress a leakage wave of a high frequency equal to or greater than several GHz as compared with the canceler device illustrated in FIG. 2.

Sixth Embodiment

In a sixth embodiment, a canceler device 6 which includes a changeover switch 28 that connects a first end of any one of a plurality of tip short-circuited stubs 26-1 to 26-3, having different characteristic impedances to each other, to a second end of a first variable resistor 21, will be described.

Figure 9:
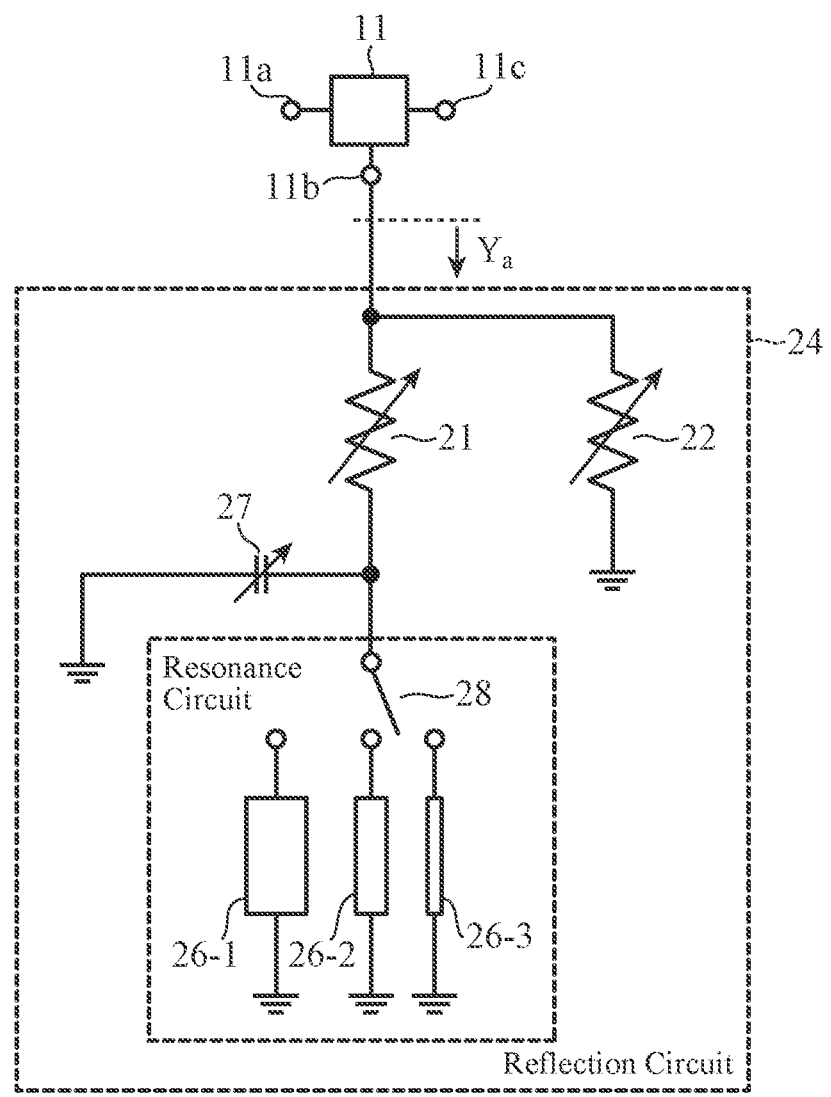
FIG. 9 is a configuration diagram illustrating a canceler device 6 according to a sixth embodiment.

FIG. 9 is a configuration diagram illustrating the canceler device 6 according to the sixth embodiment. In FIG. 9, the same symbol as that in FIG. 2 represents the same or a corresponding part, and thus description thereof is omitted.

The tip short-circuited stubs 26-1 to 26-3 are implemented by, for example, a microstrip line on a dielectric substrate.

The characteristic impedance of each of the tip short-circuited stubs 26-1 to 26-3 are different from each other.

The changeover switch 28 connects a first end of any one of the tip short-circuited stubs 26-1 to 26-3 and the second end of the first variable resistor 21.

Next, the operation of the canceler device 6 illustrated in FIG. 9 will be described.

When the changeover switch 28 switches to a tip short-circuited stub to be connected to the second end of the first variable resistor 21 from among the tip short-circuited stubs 26-1 to 26-3, the Q value of the resonance circuit changes. Therefore, it becomes possible to adjust the inclination of the frequency characteristic in a pass amplitude with the changeover switch 28 switching to a tip short-circuited stub to be connected to the second end of the first variable resistor 21 from among the tip short-circuited stubs 26-1 to 26-3.

In the canceler device 6 illustrated in FIG. 9, with the changeover switch 28 switching to a tip short-circuited stub to be connected to the second end of the first variable resistor 21 from among the tip short-circuited stubs 26-1 to 26-3, the Q value of the resonance circuit is caused to change. However, this is merely an example, and for example, the Q value of the resonance circuit may be caused to change by a control device (not illustrated) mechanically moving the position of a dielectric (not illustrated) close to the tip short-circuited stub 26 illustrated in FIG. 8 to change an effective dielectric constant contributing to the characteristic impedance of the tip short-circuited stub 26.

In the above-described sixth embodiment, the canceler device 6 illustrated in FIG. 9 is configured such that the resonance circuit includes the changeover switch 28 and the plurality of tip short-circuited stubs 26-1 to 26-3 and that the changeover switch 28 connects a first end of any one of the plurality of tip short-circuited stubs 26-1 to 26-3 and the second end of the first variable resistor 21. Therefore, similarly to the canceler device 6 illustrated in FIG. 2, the canceler device 6 illustrated in FIG. 9 can generate a cancellation signal depending on the frequency characteristic of a leakage wave without including a plurality of vector adjusters. In addition, the canceler device 6 illustrated in FIG. 9 can adjust the Q value of the resonance circuit.

Seventh Embodiment

In a seventh embodiment, a canceler device 6 including a phase shifter 31 will be described.

Figure 10:
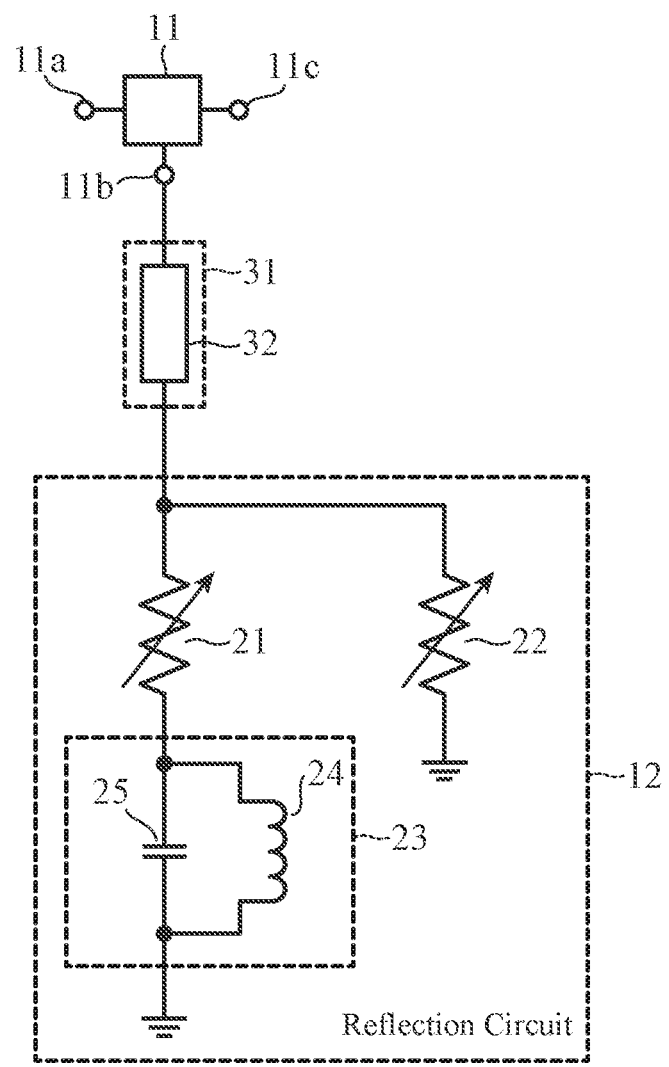
FIG. 10 is a configuration diagram illustrating a canceler device 6 according to a seventh embodiment.

FIG. 10 is a configuration diagram illustrating the canceler device 6 according to the seventh embodiment. In FIG. 10, the same symbol as that in FIG. 2 represents the same or a corresponding part, and thus description thereof is omitted.

The phase shifter 31 includes a delay line 32.

A first end of the delay line 32 is connected to a second terminal 11b of a line connector 11, and a second end of the delay line 32 is connected to a first end of each of a first variable resistor 21 and a second variable resistor 22.

Next, the operation of the canceler device 6 illustrated in FIG. 10 will be described.

The pass characteristic of the canceler device 6 illustrated in FIG. 10 is given by the reflection characteristic of a reflection circuit 12 only.

In the canceler device 6 illustrated in FIG. 10, the delay line 32 is connected between the second terminal 11b of the line connector 11 and the reflection circuit 12. Therefore, a high-frequency current that is a transmission signal output from the second terminal 11b of the line connector 11 reaches the reflection circuit 12 via the delay line 32, and a high-frequency current that is a reflected wave by the reflection circuit 12 reaches the second terminal 11b via the delay line 32. That is, the high-frequency current reciprocates in the delay line 32. Therefore, if a delay amount by the delay line 32 is θ, a group delay of 2θ occurs in the pass characteristic.

Note that in a case where the delay line 32 is connected not between the second terminal 11b and the reflection circuit 12 but between a divider 2 and the first terminal 11a or between the third terminal 11c and a combiner 7, no high-frequency current reciprocates in the delay line 32. Therefore, the group delay of the canceler device 6 is only θ. In a case where the canceler device 6 needs to obtain a group delay of 2θ, two delay lines 32 are required.

In the canceler device 6 illustrated in FIG. 10, the delay line 32 is connected between the second terminal 11b and the reflection circuit 12. Therefore, the canceler device 6 illustrated in FIG. 10 can efficiently cause a group delay.

By adjusting the group delay, noise can be reduced over a wide band by combining a group delay of a leakage wave and a group delay of the canceler device 6. Since the group delay of a leakage wave varies also depending on a frequency, it may be necessary to reduce the group delay depending on a design frequency for noise reduction. Since the phase shifter 31 includes a switch 32a, in a case where it is necessary to obtain a large group delay, as illustrated in FIG. 11, the switch 32a inserts the delay line 32 between the second terminal 11b and the reflection circuit 12, and in a case where it is necessary to reduce the group delay, the switch 32a excludes the delay line 32 from between the second terminal 11b and the reflection circuit 12.

Figure 11:
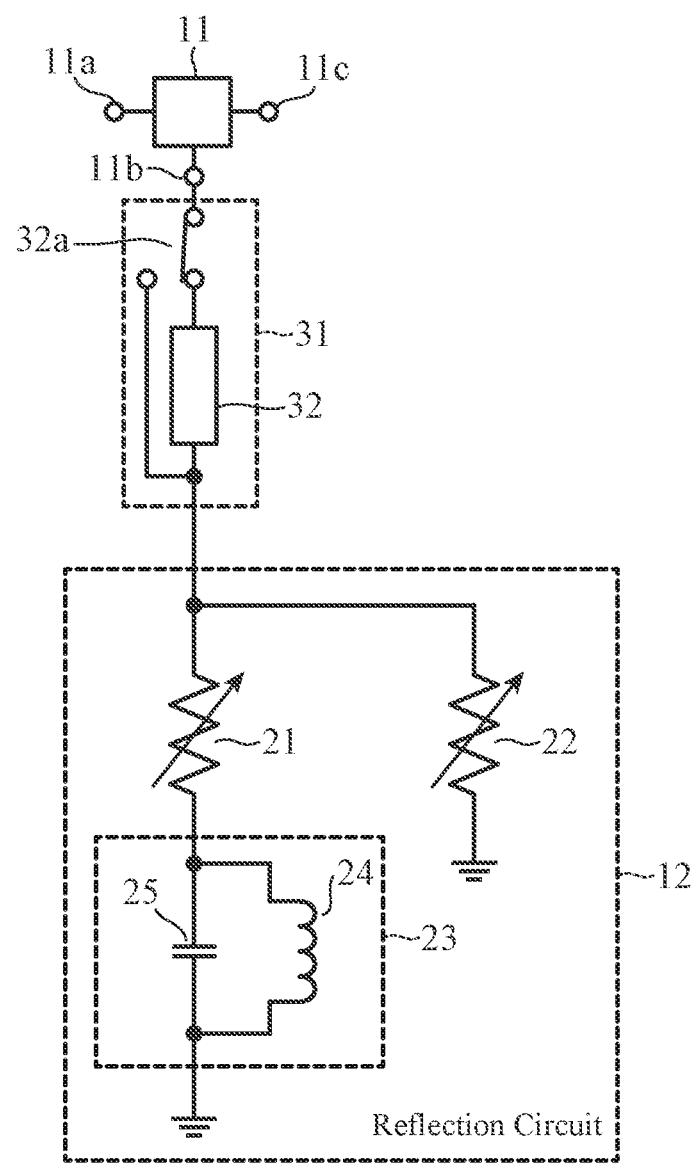
FIG. 11 is a configuration diagram illustrating another canceler device 6 according to the seventh embodiment.

FIG. 11 is a configuration diagram illustrating another canceler device 6 according to the seventh embodiment.

Figure 12:
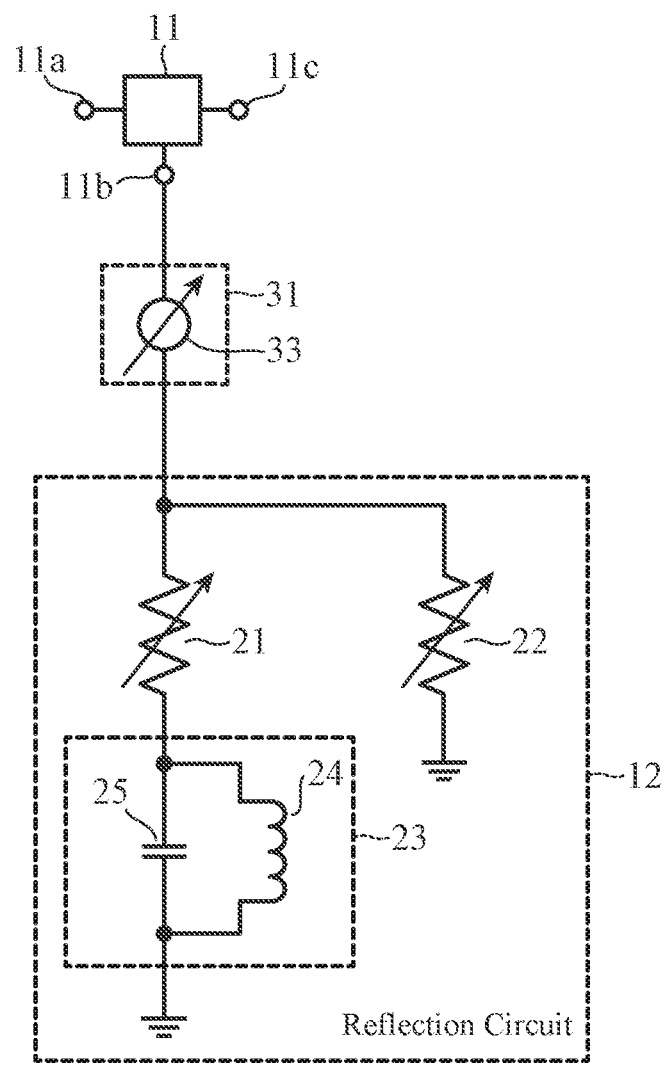
FIG. 12 is a configuration diagram illustrating another canceler device 6 according to the seventh embodiment.

In the canceler device 6 illustrated in FIG. 10, the phase shifter 31 including the delay line 32 is connected between the second terminal 11b and the reflection circuit 12. However, this is merely an example, and for example as illustrated in FIG. 12, the phase shifter 31 including a variable phase shifter 33 may be connected between the second terminal 11b and the reflection circuit 12. Unlike the delay line 32, the variable phase shifter 33 can change the delay amount θ.

FIG. 12 is a configuration diagram illustrating another canceler device 6 according to the seventh embodiment.

Eighth Embodiment

In an eighth embodiment, a canceler device 6 in which a phase shifter 31 including a variable phase shifter 33 is connected to a third terminal 11c of a line connector 11, will be described.

Figure 13:
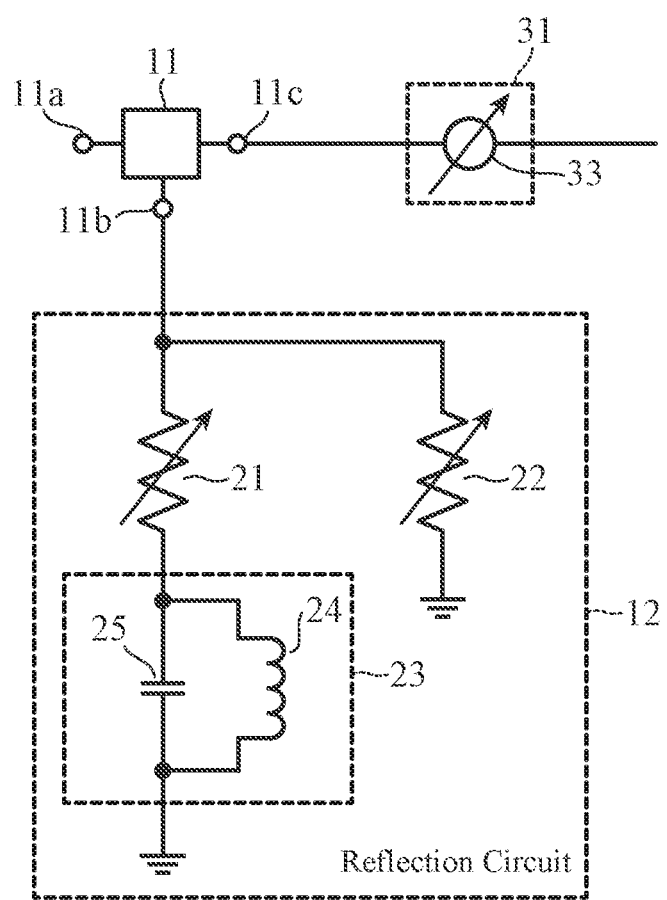
FIG. 13 is a configuration diagram illustrating a canceler device 6 according to an eighth embodiment.

FIG. 13 is a configuration diagram illustrating the canceler device 6 according to the eighth embodiment. In FIG. 13, the same symbol as that in FIGS. 2 and 12 represents the same or a corresponding part, and thus description thereof is omitted.

In the canceler device 6 illustrated in FIG. 13, the phase shifter 31 including the variable phase shifter 33 is connected to the third terminal 11c of the line connector 11.

Next, the operation of the canceler device 6 illustrated in FIG. 13 will be described.

As illustrated in FIG. 12, in a case where the variable phase shifter 33 is connected between a second terminal 11b and a reflection circuit 12, a high-frequency current reciprocates in the variable phase shifter 33. Therefore, if the phase shift amount by the variable phase shifter 33 is φ, the phase of the high-frequency current changes by 2φ by the variable phase shifter 33. In addition, if the loss caused by the variable phase shifter 33 is L, a loss of 2L is caused by the variable phase shifter 33.

For example, the variable phase shifter 33 of a voltage control type has a minimum pass loss of about 5 [dB]. Therefore, in a case where a loss of 2L is caused by the variable phase shifter 33, a loss of about 10 [dB] is caused, and the maximum pass amplitude obtained by the canceler device 6 decreases.

In the canceler device 6 illustrated in FIG. 13, since the variable phase shifter 33 is connected between the third terminal 11c and a combiner 7, a loss caused by the variable phase shifter 33 is about 5 [dB]. Therefore, in the canceler device 6 illustrated in FIG. 13, the obtained maximum pass amplitude is larger than that obtained in the canceler device 6 illustrated in FIG. 12.

In the canceler device 6 illustrated in FIG. 13, the variable phase shifter 33 is connected between the third terminal 11*c* and the combiner 7. However, this is merely an example, and the variable phase shifter 33 may be connected between the first terminal 11*a* and a divider 2.

Ninth Embodiment

In a ninth embodiment, a canceler device 6 in which a variable attenuator 34 is connected to a third terminal 11*c* of a line connector 11, will be described.

Figure 14:
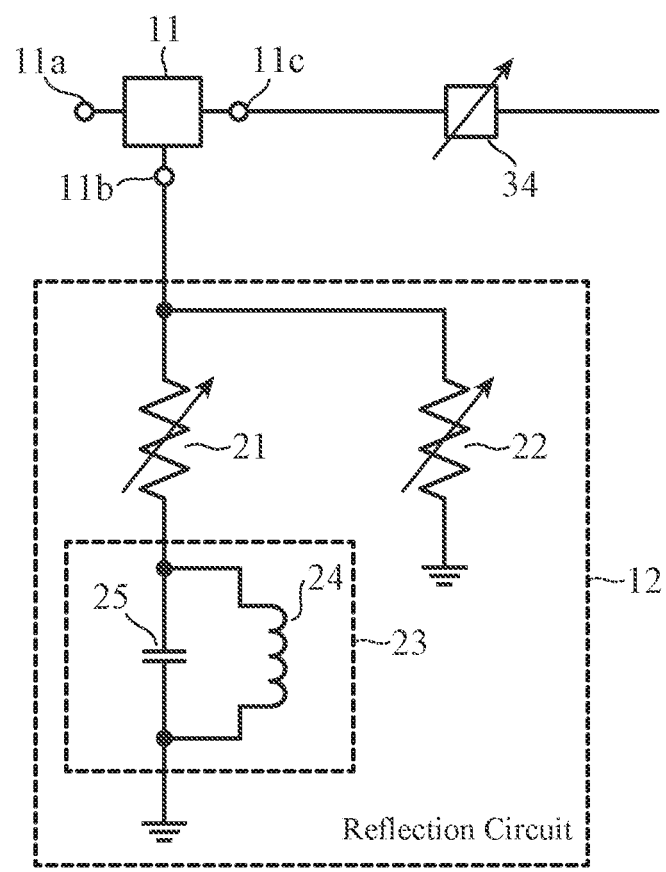
FIG. 14 is a configuration diagram illustrating a canceler device 6 according to a ninth embodiment.

FIG. 14 is a configuration diagram illustrating the canceler device 6 according to the ninth embodiment. In FIG. 14, the same symbol as that in FIG. 2 represents the same or a corresponding part, and thus description thereof is omitted.

The variable attenuator 34 is connected between the third terminal 11*c* and a combiner 7.

The variable attenuator 34 adjusts the amplitude of a signal from the third terminal 11*c* to the combiner 7.

Next, the operation of the canceler device 6 illustrated in FIG. 14 will be described.

Since the variable attenuator 34 can adjust the amplitude of a cancellation signal from the third terminal 11*c* to the combiner 7, the canceler device 6 can expand a control range of the amplitude of the cancellation signal.

In the canceler device 6 illustrated in FIG. 14, the variable attenuator 34 is connected between the third terminal 11*c* and the combiner 7. However, this is merely an example, and the variable attenuator 34 may be connected between the first terminal 11*a* and a divider 2.

Figure 15:
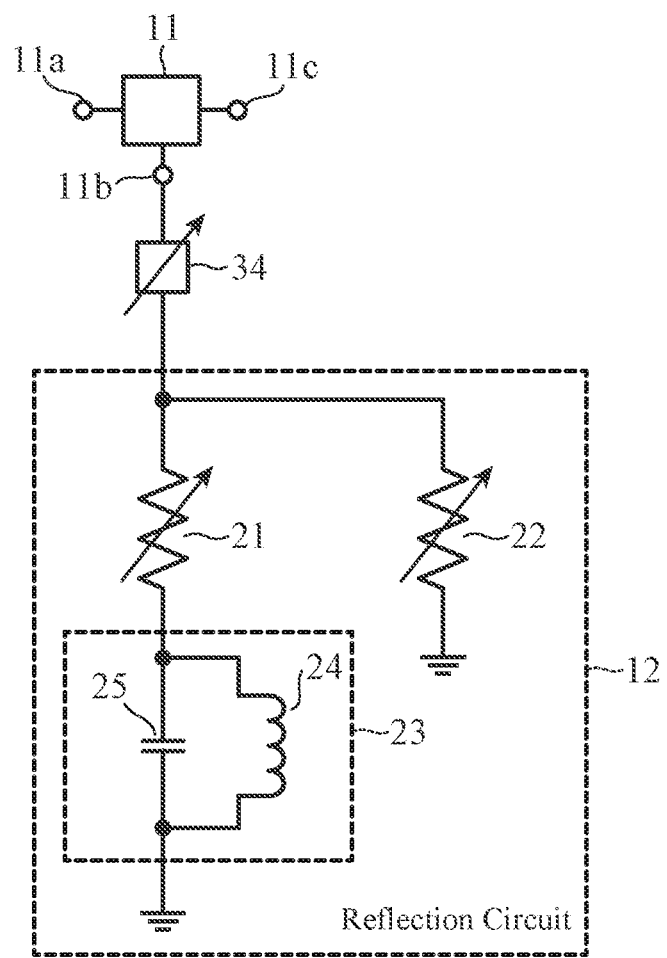
FIG. 15 is a configuration diagram illustrating another canceler device 6 according to the ninth embodiment.

Alternatively, as illustrated in FIG. 15, the variable attenuator 34 may be connected between a second terminal 11*b* and a reflection circuit 12.

FIG. 15 is a configuration diagram illustrating another canceler device 6 according to the ninth embodiment.

In the canceler device 6 illustrated in FIG. 15, the variable attenuator 34 is connected between the second terminal 11*b* and the reflection circuit 12, and thus a high-frequency current reciprocates in the variable attenuator 34. Therefore, if the amplitude adjustment width by the variable attenuator 34 is, for example, 2 [dB] to 20 [dB], with the high-frequency current reciprocating in the variable attenuator 34, the amplitude adjustment width becomes, for example, 4 [dB] to 40 [dB], thus doubling the amplitude adjustment width.

Tenth Embodiment

In a tenth embodiment, a canceler device 6 using a circulator 13 as a line connector 11 will be described.

Figure 16:
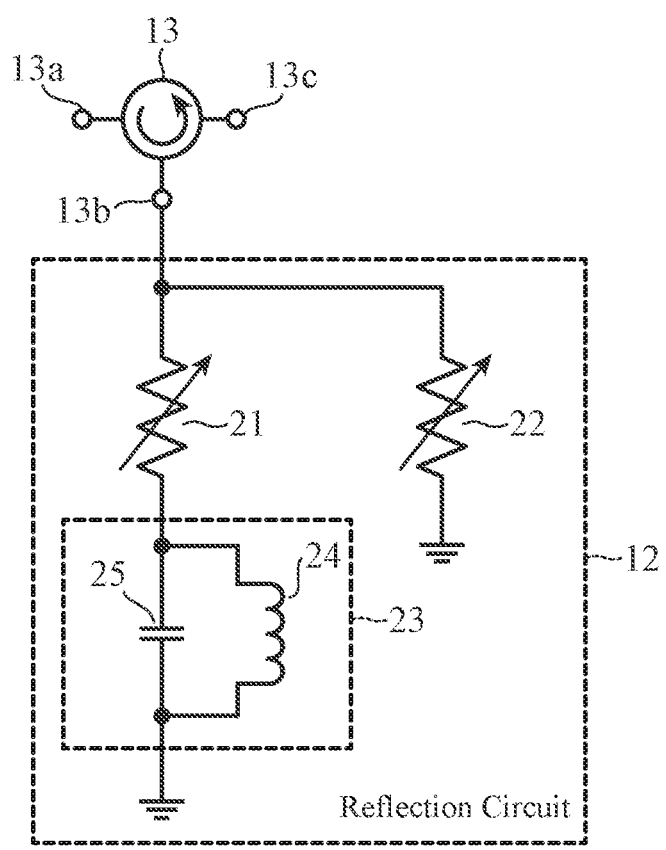
FIG. 16 is a configuration diagram illustrating a canceler device 6 according to a tenth embodiment.

FIG. 16 is a configuration diagram illustrating the canceler device 6 according to the tenth embodiment. In FIG. 16, the same symbol as that in FIG. 2 represents the same or a corresponding part, and thus description thereof is omitted.

The circulator 13 includes a first terminal 13*a*, a second terminal 13*b*, and a third terminal 13*c*.

The forward direction of the circulator 13 is a direction from the first terminal 13*a* to the second terminal 13*b*, a direction from the second terminal 13*b* to the third terminal 13*c*, and a direction from the third terminal 13*c* to the first terminal 13*a*.

The circulator 13 outputs a transmission signal provided to the first terminal 13*a* to the second terminal 13*b*.

The canceler device 6 illustrated in FIG. 16 uses the circulator 13 as the line connector 11 and operates similarly to the canceler device 6 illustrated in FIG. 2.

Eleventh Embodiment

In an eleventh embodiment, a canceler device 6 using a directional coupler 14 as a line connector 11 will be described.

Figure 17:
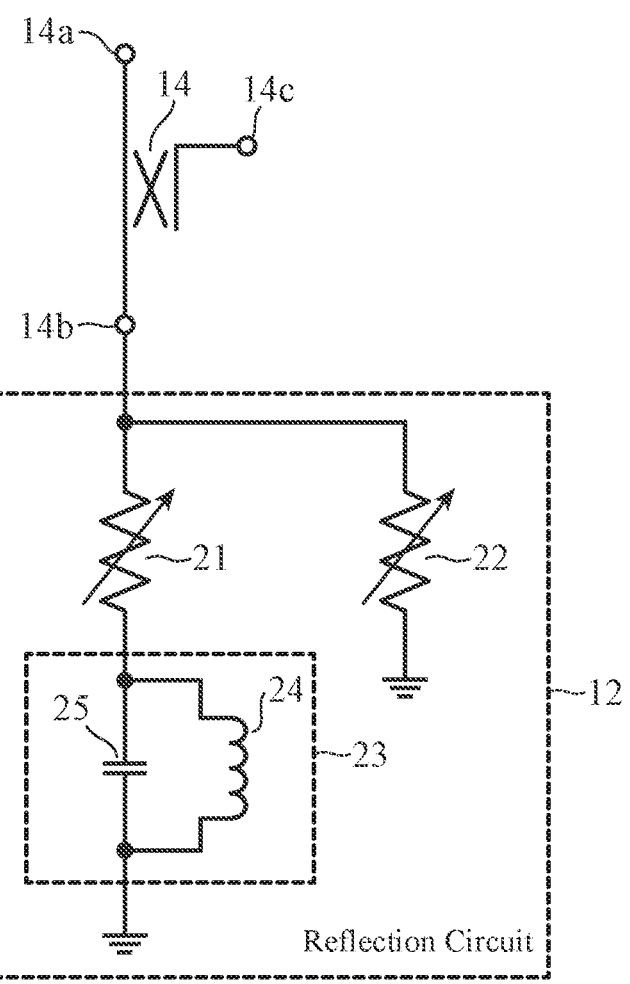
FIG. 17 is a configuration diagram illustrating a canceler device 6 according to an eleventh embodiment.

FIG. 17 is a configuration diagram illustrating the canceler device 6 according to the eleventh embodiment. In FIG. 17, the same symbol as that in FIG. 2 represents the same or a corresponding part, and thus description thereof is omitted.

The directional coupler 14 has a first terminal 14*a*, a second terminal 14*b*, and a third terminal 14*c*.

The main path of the directional coupler 14 is a path from the first terminal 14*a* to the second terminal 14*b*, and an isolation path of the directional coupler 14 is a path from the first terminal 14*a* to the third terminal 14*c*. The coupling path of the directional coupler 14 is a path from the second terminal 14*b* to the third terminal 14*c*.

Next, the operation of the canceler device 6 illustrated in FIG. 17 will be described.

The canceler device 6 illustrated in FIG. 17 is similar to the canceler device 6 illustrated in FIG. 16 except that the directional coupler 14 is used as a line connector 11.

As illustrated in FIG. 16, in a case where the canceler device 6 uses a circulator 13 as the line connector 11, isolation in the opposite direction of the circulator 13 is finite and is approximately 20 [dB]. The reverse direction of the circulator 13 is a direction from the second terminal 13*b* to the first terminal 13*a*, a direction from the third terminal 13*c* to the second terminal 13*b*, and a direction from the first terminal 13*a* to the third terminal 13*c*.

Therefore, not only a signal propagating in the forward direction but also a signal propagating in the reverse direction with a small amplitude of about 20 [dB] is output to the third terminal 13*c*. In a case where the pass amplitude is controlled to be equal to or more than 20 [dB], interference by a signal propagating in the reverse direction is not negligible, and thus the design of the canceler device 6 becomes complicated.

In the canceler device 6 illustrated in FIG. 17, the directional coupler 14 is used as the line connector 11. Since the directional coupler 14 can provide a large isolation characteristic that is equal to or greater than 30 [dB], even in a case where the pass amplitude is controlled to be equal to or greater than 30 [dB], the influence of a signal leaked from between isolation ports is negligible. Therefore, the canceler device 6 illustrated in FIG. 17 can be more easily designed than the canceler device 6 illustrated in FIG. 16, and the adjustment range of the pass amplitude can be expanded.

Twelfth Embodiment

In a twelfth embodiment, a canceler device 6 in which a resonance circuit of a reflection circuit 12 is a series resonance circuit 41 will be described.

Figure 18:
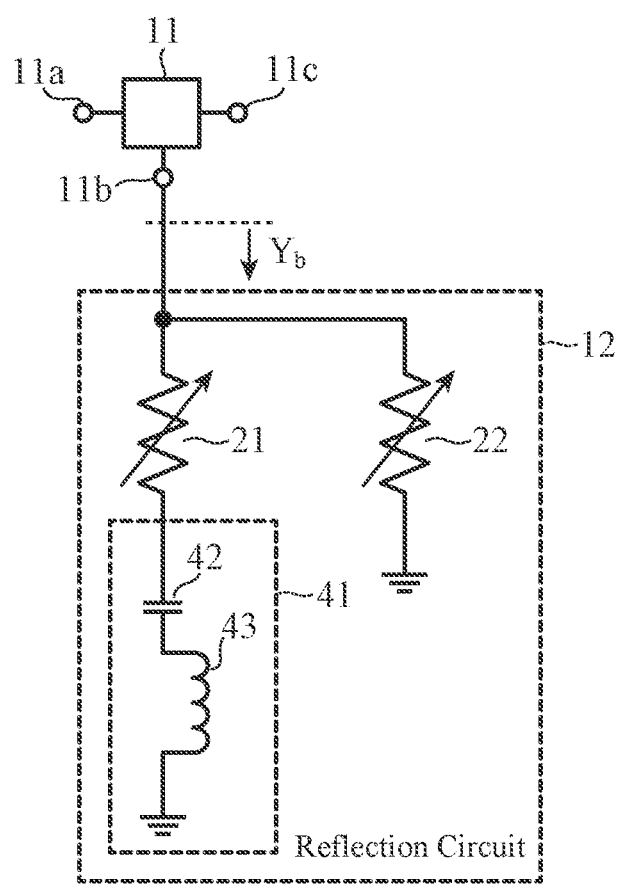
FIG. 18 is a configuration diagram illustrating a canceler device 6 according to a twelfth embodiment.

FIG. 18 is a configuration diagram illustrating the canceler device 6 according to the twelfth embodiment. In FIG. 18, the same symbol as that in FIG. 2 represents the same or a corresponding part, and thus description thereof is omitted.

In the canceler device 6 illustrated in FIG. 18, the reflection circuit 12 includes a first variable resistor 21, a second variable resistor 22, and the series resonance circuit 41.

The series resonance circuit 41 includes a capacitor 42 and an inductor 43.

A first end of the series resonance circuit 41 is connected to a second end of the first variable resistor 21, and a second end of the series resonance circuit 41 is grounded.

A first end of the capacitor 42 is connected to the second end of the first variable resistor 21, and a second end of the capacitor 42 is connected to a first end of the inductor 43. The capacitance of the capacitor 42 is denoted by C.

The first end of the inductor 43 is connected to the second end of the capacitor 42, and a second end of the inductor 43 is grounded. The inductance of the inductor 43 is denoted by L.

In the canceler device 6 illustrated in FIG. 18, the series resonance circuit 41 is applied to the canceler device 6 illustrated in FIG. 2. However, this is merely an example, and the series resonance circuit 41 may be applied to any of the canceler devices 6 illustrated in FIGS. 5 to 17.

In the canceler device 6 illustrated in FIG. 18, the first end of the capacitor 42 is connected to the second end of the first variable resistor 21, the first end of the inductor 43 is connected to the second end of the capacitor 42, and the second end of the inductor 43 is grounded. However, this is merely an example, and the first end of the inductor 43 may be connected to the second end of the first variable resistor 21, the first end of the capacitor 42 may be connected to the second end of the inductor 43, and the second end of the capacitor 42 may be grounded.

Next, the operation of the canceler device 6 illustrated in FIG. 18 will be described.

The line connector 11 outputs the transmission signal provided to the first terminal 11a to the second terminal 11b.

When the transmission signal provided to the first terminal 11a is output to the second terminal 11b, the reflection circuit 12 outputs a reflected wave of the transmission signal to the third terminal 11c.

Each of the amplitude and the phase of the reflected wave of the transmission signal is determined by a combined admittance $Y_b$ of the reflection circuit 12.

The combined admittance $Y_b$ is represented by the following Equation (9).

$$Y_b = \frac{1}{R_1 + j\left(\omega L - \frac{1}{\omega C}\right)} + \frac{1}{R_2} \quad (9)$$

In the canceler device 6 illustrated in FIG. 18, the line connector 11 is implemented by a circulator, and it is based on the premise that the circulator has an ideal characteristic. The ideal characteristic include an insertion loss of 0 [dB], infinite isolation, and a reflection loss of 0 [dB].

With the combined admittance $Y_b$ expressed by a combined impedance $Z_b$ ($1/Y_b$), a reflection coefficient $\Gamma_b$ of the reflection circuit 12 is expressed by following Equation (10).

$$\Gamma_b = \frac{Z_b - Z_0}{Z_b + Z_0} \quad (10)$$

Therefore, an S parameter $S_{21}$ indicating the pass characteristic from the first terminal 11a to the third terminal 11c is expressed by the following Equation (11). The first terminal 11a corresponds to a port 1, and the third terminal 11c corresponds to a port 2.

$$S_{21} [dB] = 20 * \log_{10}(|\Gamma_b|) \quad (11)$$

The amplitude frequency characteristic of the pass characteristic is determined by a resistance value $R_1$ of the first variable resistor 21, a resistance value $R_2$ of the second variable resistor 22, and the inductance L and the capacitance C which are circuit specifications of the series resonance circuit 41.

Hereinafter, a method of controlling the amplitude frequency characteristic will be described.

Figure 19A:
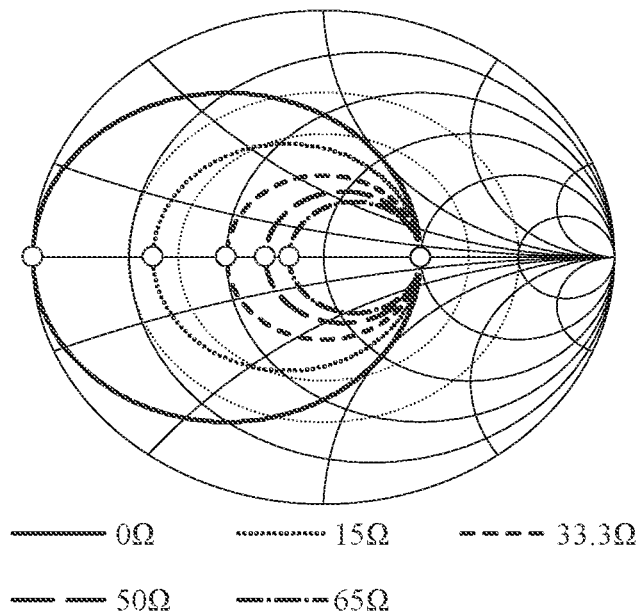
FIG. 19A is an explanatory diagram illustrating an impedance characteristic of the canceler device 6.
Figure 19B:
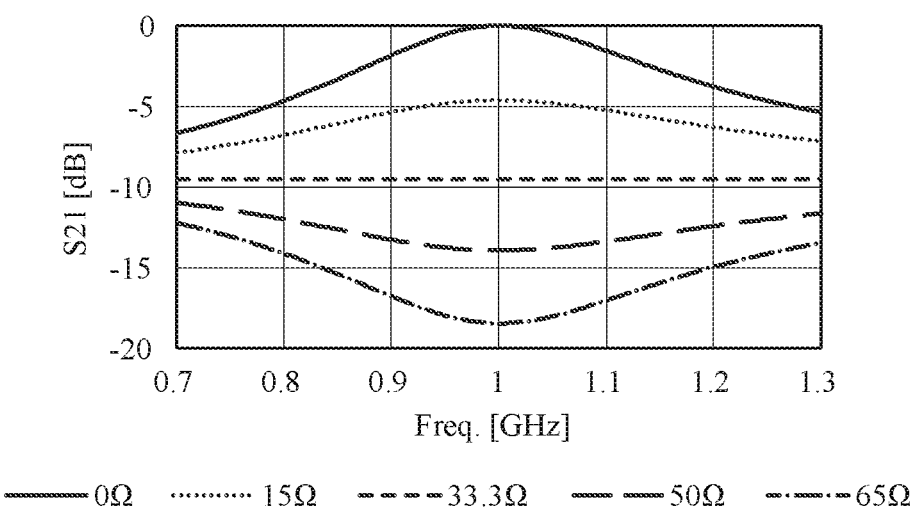
FIG. 19B is an explanatory diagram illustrating a $S_{21}$ characteristic which is a pass characteristic of the canceler device 6.

FIG. 19A is an explanatory diagram illustrating an impedance characteristic of the canceler device 6, and FIG. 19B is an explanatory diagram illustrating a $S_{21}$ characteristic which is a pass characteristic of the canceler device 6.

FIG. 19B illustrates, based on the premise that the resistance value $R_2$ of the second variable resistor 22 is 100 [Ω], that the inductance L of the inductor 43 is 20 [nH], and that the resonance frequency fr of the series resonance circuit 41 is 1 [GHz], the $S_{21}$ characteristic in response to changes in the resistance value $R_1$ of the first variable resistor 21.

In FIGS. 19A and 19B, a solid line indicates a resistance value $R_1$ of 0 [Ω], a dotted line indicates a resistance value $R_1$ of 15 [Ω], a short-interval broken line indicates a resistance value $R_1$ of 33.3 [Ω], a long-interval broken line indicates a resistance value $R_1$ of 50 [Ω], and a one-dot chain line indicates a resistance value $R_1$ of 65 [Ω]. An open circle "○" denotes the resonance frequency fr.

As illustrated in FIG. 19B, the frequency characteristic of a pass amplitude changes as the resistance value $R_1$ of the first variable resistor 21 changes.

That is, in a case where the resistance value $R_1$ of the first variable resistor 21 is 0 [Ω] or the resistance value $R_1$ is 15 [Ω], the frequency characteristic of a pass amplitude has a convex shape, and in a case where the resistance value $R_1$ of the first variable resistor 21 is 33.3 [Ω], the frequency characteristic of a pass amplitude has a flat shape.

Moreover, in a case where the resistance value $R_1$ of the first variable resistor 21 is 50 [Ω] or the resistance value $R_1$ is 65 [Ω], the frequency characteristic of a pass amplitude has a concave shape.

Therefore, for example, with a control device (not illustrated) changing only the resistance value $R_1$ of the first variable resistor 21, it is possible to form a convex frequency characteristic of a pass amplitude, a concave frequency characteristic of a pass amplitude, or a flat frequency characteristic of a pass amplitude.

As the resistance value $R_1$ of the first variable resistor 21 and the resistance value $R_2$ of the second variable resistor 22 change, the inclination of the concave shape of the concave frequency characteristic of the pass amplitude or the inclination of the convex shape in the convex frequency characteristic of the pass amplitude changes.

In a case where the pass characteristic of the canceler device 6 has a concave frequency characteristic of the pass amplitude, for example with a control device (not illustrated) causing the resistance value $R_2$ of the second variable resistor 22 to change, the minimum value of the pass amplitude changes. In a case where the pass characteristic of the canceler device 6 has a convex frequency characteristic of the pass amplitude, for example with a control device (not illustrated) causing the resistance value $R_2$ of the second variable resistor 22 to change, the maximum value of the pass amplitude changes.

When one or more of the inductance L of the inductor 43 and the capacitance C of the capacitor 42 change in a state where the resonance frequency fr of the series resonance circuit 41 is maintained, and a Q value of the series resonance circuit 41 changes, the inclination of the convex shape or the inclination of the concave shape changes. The Q value of the series resonance circuit 41 is expressed by the following Equation (12).

$$Q = \frac{1}{R}\sqrt{\frac{L}{C}} \qquad (12)$$

In Equation (12), R denotes a resistance component included in the series resonance circuit 41. That is, it is a resistance component (not illustrated) connected in series with each of the inductance L and the capacitance C.

When one or more of the inductance L and the capacitance C change, the frequency of the minimum value and the frequency of the maximum value of each of the pass amplitude of the convex shape and the pass amplitude of the concave shape change. Therefore, the canceler device 6 can generate a cancellation signal having a rising frequency characteristic or a decreasing frequency characteristic in a desired band.

The condition for the frequency characteristic of a pass amplitude to be flat, namely, the condition for the frequency characteristic of a pass amplitude to be a boundary between a convex frequency characteristic of a pass amplitude and a concave frequency characteristic of a pass amplitude is as follows.

The condition for a frequency characteristic of a pass amplitude to be flat is that a reflection coefficient $\Gamma_b$ (f=fr), at the resonance frequency fr of the series resonance circuit 41, and the reflection coefficient $\Gamma_b$ (f=0), when the frequency f of the transmission signal is 0 in the limit, have the same value but opposite signs.

The reflection coefficient $\Gamma_b$ (f=0), when the frequency f of the transmission signal is 0 in the limit, is determined by the resistance value $R_2$ of the second variable resistor 22 regardless of the resistance value $R_1$ of the first variable resistor 21. The combined admittance $Y_b$ (f=0) at this point is $1/R_2$. The combined admittance $Y_b$ (f=fr) with a reflection coefficient of $\Gamma_b$ (f=fr) having the same value as that of the reflection coefficient $\Gamma_b$ (f=0) but an opposite sign to that of the reflection coefficient $\Gamma_b$ (f=0) is $R_2/Z_0^2$. Therefore, in Equation (9), the condition for the frequency characteristic of a pass amplitude to be flat is obtained from the conditional expression where the combined admittance $Y_b$ equals $R_2/Z_0^2$. An imaginary part of a first term on the right side of Equation (9) where each of the frequency f and the angular frequency ω is zero in the limit equals zero as shown in the following Equation (13).

$$\lim_{\omega \to +0}\left(\frac{1}{\omega L - \frac{1}{\omega C}}\right) = 0 \qquad (13)$$

Therefore, Equation (9) when each of the frequency f and the angular frequency ω equals zero in the limit is expressed as the following Equation (14).

$$\frac{R_2}{Z_0^2} = \frac{1}{R_1} + \frac{1}{R_2} \qquad (14)$$

Solving Equation (14) for the resistance value $R_1$ of the first variable resistor 21, the resistance value $R_1$ is expressed as the following Equation (15).

$$R_1 = \frac{R_2 Z_0^2}{R_2^2 - Z_0^2} \qquad (15)$$

The frequency characteristic of a pass amplitude is flat where Equation (15) holds.

In a case where the frequency characteristic of a pass amplitude is close to the boundary between the region with a convex shape and the region with a concave shape, each of the inclinations of a convex frequency characteristic of a pass amplitude and a concave frequency characteristic of a pass amplitude is gentle. There is a clear boundary condition between a convex frequency characteristic of pass amplitudes and a concave frequency characteristic of the pass amplitudes, and the canceler device 6 illustrated in FIG. 18 can control the frequency characteristic of a pass amplitude.

In the above twelfth embodiment, the canceler device 6 illustrated in FIG. 18 is configured such that the series resonance circuit 41 includes the inductor 43 and the capacitor 42 and that the inductor 43 and the capacitor 42 are connected in series. Therefore, similarly to the canceler device 6 illustrated in FIG. 2, the canceler device 6 illustrated in FIG. 18 can generate a cancellation signal depending on the frequency characteristic of a leakage wave without including a plurality of vector adjusters.

Thirteenth Embodiment

In a thirteenth embodiment, a canceler device 6 in which a resonance circuit of a reflection circuit 12 includes a tip open stub 45 instead of a series resonance circuit 41, will be described.

Figure 20:
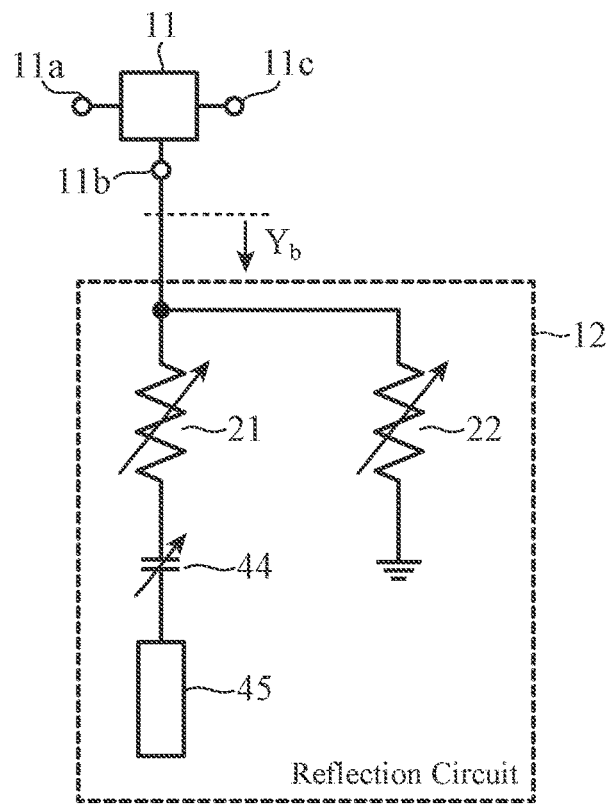
FIG. 20 is a configuration diagram illustrating a canceler device 6 according to a thirteenth embodiment.

FIG. 20 is a configuration diagram illustrating the canceler device 6 according to the thirteenth embodiment. In FIG. 20, the same symbol as that in FIGS. 2 and 18 represents the same or a corresponding part, and thus description thereof is omitted.

In the canceler device 6 illustrated in FIG. 20, the reflection circuit 12 includes a first variable resistor 21, a second variable resistor 22, a variable capacitor 44, and the tip open stub 45.

The variable capacitor 44 is implemented by, for example, an electrically controlled element or a mechanically controlled element. A variable capacitance diode or the like corresponds to the electrically controlled element.

A first end of the variable capacitor 44 is connected to a second end of the first variable resistor 21, and a second end of the variable capacitor 27 is connected to a non-open end of the tip open stub 45.

The tip open stub 45 is implemented by, for example, a microstrip line on a dielectric substrate.

The non-open end which is a first end of the tip open stub 45 is connected to the second end of the variable capacitor 27, and a second end of the tip open stub 45 is an open end.

In a case where the electrical length of the tip open stub 45 is 0.25 wavelengths×(2N+1), the resonance frequency is given by a frequency corresponding to 0.25 wavelengths× (2N+1). Symbol N is an integer greater than or equal to 0. Around the resonance frequency, the tip open stub 45 operates as a series resonance circuit.

In a case where a tip short-circuited stub having an electrical length of 0.5 wavelengths×(2N+1) is used instead of a series resonance circuit 41, the resonance frequency is given by a frequency corresponding to 0.5 wavelengths× (2N+1). Around the resonance frequency, the tip short-circuited stub operates as a series resonance circuit.

In the canceler device 6 illustrated in FIG. 20, the variable capacitor 44 and the tip open stub 45 are applied to the canceler device 6 illustrated in FIG. 2. However, this is merely an example, and the variable capacitor 44 and the tip open stub 45 may be applied to any of the canceler devices 6 illustrated in FIGS. 5 to 17.

In the canceler device 6 illustrated in FIG. 20, the reflection circuit 12 includes the variable capacitor 44. However, this is merely an example, and the reflection circuit 12 may not include the variable capacitor 44. In a case where the reflection circuit 12 does not include the variable capacitor 44, the first end of the tip open stub 45 is connected to the second end of the first variable resistor 21.

Next, the operation of the canceler device 6 illustrated in FIG. 20 will be described.

A Q value of the tip open stub 45 changes, for example, when the characteristic impedance of a microstrip line included in the tip open stub 45 changes. The characteristic impedance of the microstrip line changes as the thickness of a dielectric substrate or the line width changes.

In the canceler device 6 illustrated in FIG. 18, since the reflection circuit 12 includes the series resonance circuit 41, and the series resonance circuit 41 includes the inductor 43 which is a lumped-parameter element and the capacitor 42 which is a lumped-parameter element, the series resonance circuit 41 has a resistance component. Therefore, there are cases where it is difficult to increase the Q value of the series resonance circuit 41.

In the canceler device 6 illustrated in FIG. 20, for example, in a case where the tip open stub 45 having a distributed constant is implemented by a microstrip line on a low-loss dielectric substrate, the Q value of the tip open stub 45 can be made higher than the Q value of the series resonance circuit 41.

An equivalent circuit of the tip open stub 45 is a series resonance circuit in which an inductor and a capacitor are connected in series. Therefore, in the tip open stub 45, the resonance frequency fr changes with the capacitance of the variable capacitor 44 adjusted.

In the above thirteenth embodiment, the canceler device 6 illustrated in FIG. 20 is configured such that the resonance circuit includes the tip open stub 45. Therefore, similarly to the canceler device 6 illustrated in FIG. 18, the canceler device 6 illustrated in FIG. 20 can generate a cancellation signal depending on the frequency characteristic of a leakage wave without including a plurality of vector adjusters. In addition, the canceler device 6 illustrated in FIG. 20 can increase the Q value of the resonance circuit and can also suppress a leakage wave of a high frequency equal to or greater than several GHz as compared with the canceler device 6 illustrated in FIG. 18.

Fourteenth Embodiment

In the wireless device illustrated in FIG. 1, the antenna unit 3 includes the divider 4 and the transmission and reception shared antenna 5.

In a fourteenth embodiment, a wireless device in which an antenna unit 3 includes a transmission antenna 9 and a reception antenna 10 will be described.

Figure 21:
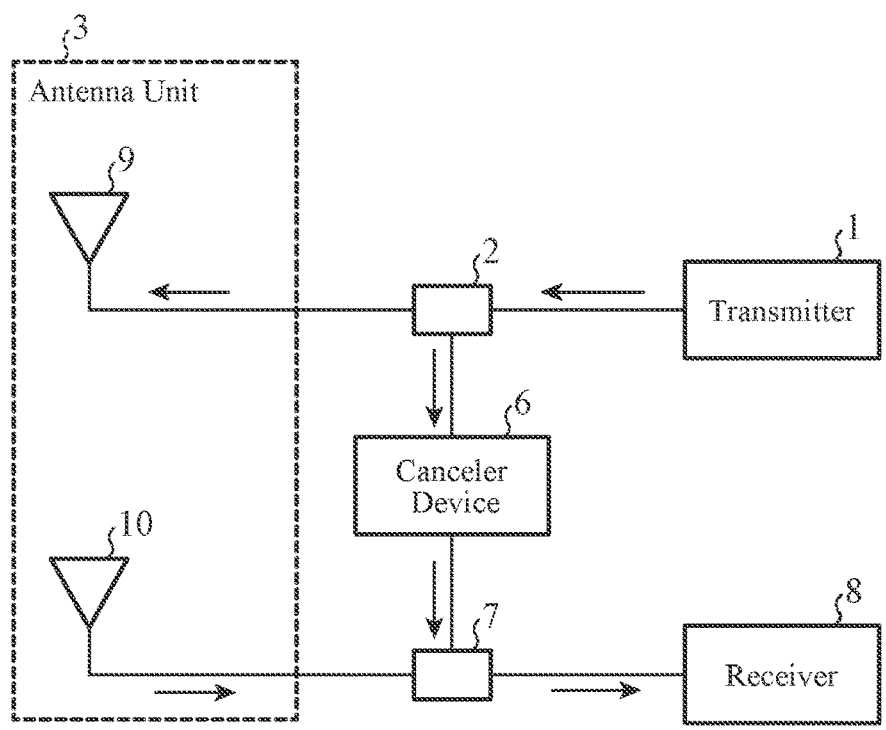
FIG. 21 is a configuration diagram illustrating a wireless device including a canceler device 6 according to a fourteenth embodiment.

FIG. 21 is a configuration diagram illustrating the wireless device including a canceler device 6 according to the fourteenth embodiment. In FIG. 21, the same symbol as that in FIG. 1 represents the same or a corresponding part, and thus description thereof is omitted.

The antenna unit 3 includes the transmission antenna 9 and the reception antenna 10.

The transmission antenna 9 radiates a first transmission signal output from a divider 2 into space as an electromagnetic wave.

The reception antenna 10 receives an incoming electromagnetic wave and outputs a reception signal of the received electromagnetic wave to a combiner 7.

It is similar to the wireless device illustrated in FIG. 1 except that the antenna unit 3 includes the transmission antenna 9 and the reception antenna 10.

Fifteenth Embodiment

In a fifteenth embodiment, a wireless device including a control device 50 will be described.

Figure 22:
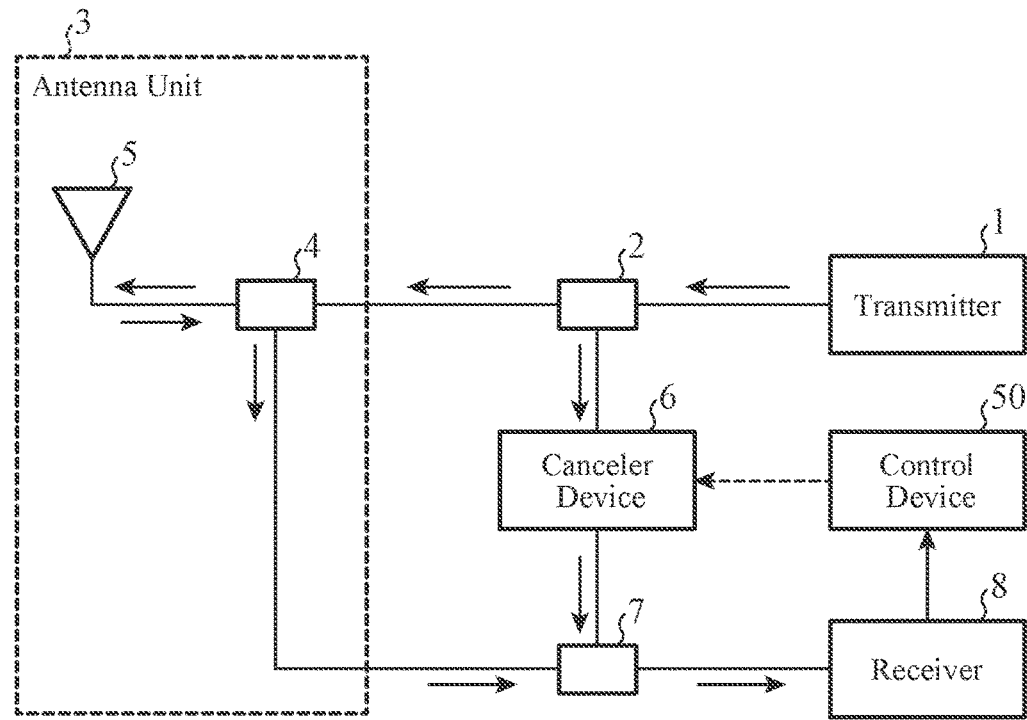
FIG. 22 is a configuration diagram illustrating a wireless device including a canceler device 6 according to a fifteenth embodiment.

FIG. 22 is a configuration diagram illustrating the wireless device including a canceler device 6 according to the fifteenth embodiment. In FIG. 22, the same symbol as that in FIGS. 1 and 21 represents the same or a corresponding part, and thus description thereof is omitted.

The control device 50 controls circuit specifications of a canceler device 6 in accordance with a reception signal detected by a receiver 8.

In the wireless device illustrated in FIG. 22, the control device 50 is applied to the wireless device illustrated in FIG. 1. However, this is merely an example, and the control device 50 may be applied to the wireless device illustrated in FIG. 21.

Next, the operation of the wireless device illustrated in FIG. 22 will be described. Since it is similar to the wireless device illustrated in FIG. 1 except for the control device 50, only the operation of the control device 50 will be described here.

The control device 50 monitors the reception signal detected by the receiver 8 and detects the reception level of a leakage wave to be canceled.

The control device 50 controls the circuit specifications of the canceler device 6 in such a manner as to reduce the reception level of the leakage wave to be canceled. The circuit specifications of the canceler device 6 include the resistance value $R_1$ of the first variable resistor 21, the resistance value $R_2$ of the second variable resistor 22, the capacitance of the variable capacitor 27, the capacitance of the variable capacitor 44, and others.

Since the control method of the circuit specifications by the control device 50 may be any method as long as the reception level of the leakage wave decreases, the description of the specific control method is omitted.

In the wireless device illustrated in FIG. 22, the control device 50 controls the circuit specifications of the canceler device 6 in such a manner as to suppress a leakage wave of a transmission signal. The control device 50 may control the circuit specifications of the canceler device 6 such that not only the leakage wave of the transmission signal but also noise or a desired signal is suppressed.

In the above fifteenth embodiment, the wireless device is configured to include the control device 50 that controls the circuit specifications of the canceler device 6 in accordance with the reception signal detected by the receiver 8. Therefore, the wireless device can reduce the reception level of the leakage wave.

In the wireless device illustrated in FIG. 22, the control device 50 controls the circuit specifications of the canceler device 6 in accordance with the reception signal detected by the receiver 8. However, this is merely an example, and as illustrated in FIG. 23, a divider 51 that divides a reception signal output from a combiner 7 into two, outputs a first reception signal of the two divided reception signals to the control device 50, and outputs a second reception signal of the two divided reception signals to the receiver 8 may be included, and the control device 50 may control the circuit specifications of the canceler device 6 in accordance with the first reception signal output from the divider 51.

Figure 23:
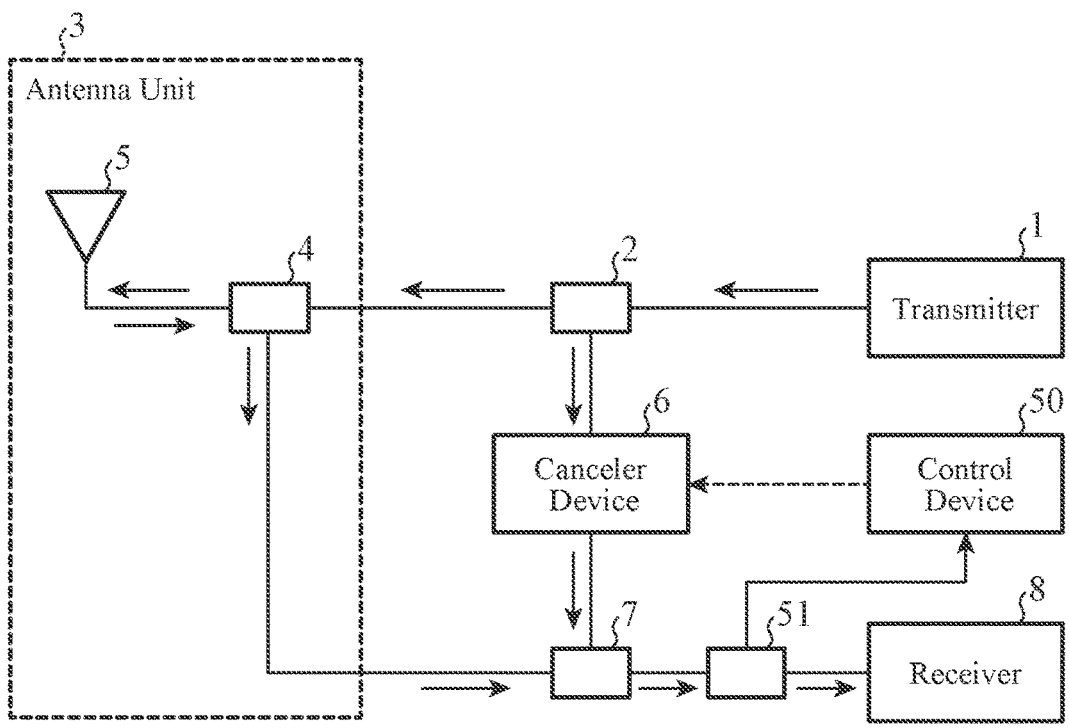
FIG. 23 is a configuration diagram illustrating another wireless device according to the fifteenth embodiment.

FIG. 23 is a configuration diagram illustrating another wireless device according to the fifteenth embodiment.

Note that the present invention may include a flexible combination of the embodiments, a modification of any component of the embodiments, or omission of any component in the embodiments.

INDUSTRIAL APPLICABILITY

The present disclosure is suitable for a canceler device and a wireless device.

REFERENCE SIGNS LIST

1: Transmitter, 2: Divider, 3: Antenna unit, 4: Divider, 5: Transmission and reception shared antenna, 6: Canceler device, 7: Combiner, 8: Receiver, 9: Transmission antenna, 10: Reception antenna, 11: Line Connector, 11a: First terminal, 11b: Second terminal, 11c: Third terminal, 12: Reflection circuit, 13: Circulator, 13a: First terminal, 13b: Second terminal, 13c: Third terminal, 14: Directional coupler, 14a: First terminal, 14b: Second terminal, 14c: Third terminal, 21: First variable resistor, 22: Second variable resistor, 23: Parallel resonance circuit, 24: Inductor, 25: Capacitor, 26, 26-1 to 26-3: Tip short-circuited stub, 27: Variable capacitor, 28: Changeover switch, 31: Phase shifter, 32: Delay line, 32a: Switch, 33: Variable phase shifter, 34: Variable attenuator, 41: Series resonance circuit, 42: Capacitor, 43: Inductor, 44: Variable capacitor, 45: Tip open stub, 50: Control device, 51: Divider

The invention claimed is:

1. A canceler device comprising:
a line connector having a first terminal, a second terminal, and a third terminal, the line connector being configured to output a signal provided to the first terminal to the second terminal; and
a reflection circuit to output a reflected wave of the signal output to the second terminal to the third terminal, wherein the reflection circuit includes:
a first variable resistor having a first end connected to the second terminal; and
a second variable resistor having a first end connected to the second terminal and a second end grounded; and
a resonance circuit having a first end connected to a second end of the first variable resistor and a second end grounded.

2. The canceler device according to claim 1, wherein the resonance circuit is a parallel resonance circuit including:
an inductor having a first end connected to the second end of the first variable resistor and a second end grounded; and
a capacitor connected in parallel with the inductor.

3. The canceler device according to claim 1, wherein the resonance circuit comprises:
a tip short-circuited stub having a first end connected to the second end of the first variable resistor and a second end grounded.

4. The canceler device according to claim 3, further comprising a variable capacitor having a first end connected to the second end of the first variable resistor and a second end grounded.

5. The canceler device according to claim 1, wherein the resonance circuit comprises:
a changeover switch; and
a plurality of tip short-circuited stubs having characteristic impedances different from each other, and
the changeover switch connects a first end of any one of the plurality of tip short-circuited stubs and the second end of the first variable resistor.

6. The canceler device according to claim 1, further comprising a phase shifter having a first end connected to the second terminal and a second end connected to a first end of each of the first variable resistor and the second variable resistor.

7. The canceler device according to claim 6, wherein the phase shifter includes a switch, and
the switch inserts the phase shifter between the second terminal and a first end of each of the first variable resistor and the second variable resistor or excludes the phase shifter from between the second terminal and a first end of each of the first variable resistor and the second variable resistor.

8. The canceler device according to claim 1, further comprising a phase shifter having a first end connected to the third terminal.

9. The canceler device according to claim 1, further comprising a variable attenuator having a first end connected to the second terminal and a second end connected to a first end of each of the first variable resistor and the second variable resistor.

10. The canceler device according to claim 1, further comprising a variable attenuator having a first end connected to the third terminal.

11. The canceler device according to claim 1, wherein the line connector is a circulator.

12. The canceler device according to claim 1, wherein the line connector is a directional coupler.

13. The canceler device according to claim 1, wherein the resonance circuit is a series resonance circuit including an inductor and a capacitor, and
the inductor and the capacitor are connected in series.

14. The canceler device according to claim 1, wherein the resonance circuit comprises:
a tip open stub having a first end connected to the second end of the first variable resistor and a second end opened.

15. The canceler device according to claim 14, further comprising a variable capacitor having a first end connected to the second end of the first variable resistor and a second end connected to a non-open end of the tip open stub.

16. A wireless device comprising:
a transmitter to output a transmission signal;
an antenna to radiate the transmission signal output from the transmitter into space as an electromagnetic wave, to receive an incoming electromagnetic wave, to output a reception signal of the received electromagnetic wave, and to output a part of the transmission signal as a leakage wave;
a receiver to detect the reception signal output from the antenna;
a canceler device according to claim 1;
a divider to divide the transmission signal output from the transmitter into two, to output a first transmission signal of the two divided transmission signals to the antenna, and to output a second transmission signal of the two divided transmission signals to the canceler device; and
a combiner to combine the leakage wave output from the antenna with a signal output from the canceler device and to output, to the receiver, a combined signal of the leakage wave and the signal output from the canceler device and the reception signal output from the antenna, wherein the second transmission signal output from the divider is provided to the first terminal of the line connector in the canceler device, and a signal output from the third terminal of the line connector is output to the combiner.

17. The wireless device according to claim 16, further comprising a control device to control circuit specifications of the canceler device in accordance with the reception signal detected by the receiver.

* * * * *